United States Patent
Kominami

(10) Patent No.: US 6,679,684 B2
(45) Date of Patent: Jan. 20, 2004

(54) PUMP DEVICE HAVING A DEVICE FOR RESTRICTING MOVEMENT OF A MOVABLE MEMBER MOVABLE TO PRESSURIZE WORKING FLUID

(75) Inventor: Yoshiaki Kominami, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 107 days.

(21) Appl. No.: 10/067,786

(22) Filed: Feb. 8, 2002

(65) Prior Publication Data

US 2002/0110460 A1 Aug. 15, 2002

(30) Foreign Application Priority Data

Feb. 13, 2001 (JP) ........................................ 2001-035877

(51) Int. Cl.[7] .............................................. F04B 19/00
(52) U.S. Cl. ........................................... 417/214; 92/13
(58) Field of Search ................................ 417/214, 553, 417/470, 554; 92/13, 129, 169.1, 171.1

(56) References Cited

U.S. PATENT DOCUMENTS

| | | | | |
|---|---|---|---|---|
| 3,552,273 A | * | 1/1971 | Resuggan | 91/401 |
| 4,498,846 A | * | 2/1985 | Gassman | 417/214 |
| 5,201,174 A | * | 4/1993 | Barber et al. | 60/405 |
| 5,320,498 A | * | 6/1994 | Fuchida | 417/214 |

FOREIGN PATENT DOCUMENTS

| | | |
|---|---|---|
| JP | U-58-161177 | 10/1983 |
| JP | U-59-65994 | 5/1984 |
| JP | 8-93650 | * 4/1996 |
| JP | 8-093650 | 4/1996 |
| JP | 8-104214 | 4/1996 |
| JP | 8-188137 | 7/1996 |
| JP | 10-184483 | 7/1998 |
| JP | 11-082320 | 3/1999 |
| JP | 2000-64965 | 3/2000 |

\* cited by examiner

*Primary Examiner*—Justine R. Yu
*Assistant Examiner*—Han L Liu
(74) *Attorney, Agent, or Firm*—Kenyon & Kenyon

(57) ABSTRACT

A pump device comprising a support member having a fitting recess, a movable member which is reciprocated in said fitting recess to suck a working fluid, pressurize the fluid and deliver the pressurized fluid, and a movement restricting device operable to deform a wall at least partially defining the fitting recess of the support member, such that the wall is deformed toward the movable member, for restricting a reciprocating movement of the movable member in the fitting recess, at least when an amount of the pressurized fluid required to be delivered by the pump device is smaller than a nominal delivery amount of the pump device.

29 Claims, 12 Drawing Sheets

PUMP DEVICE HAVING A DEVICE FOR RESTRICTING MOVEMENT OF A MOVABLE MEMBER MOVABLE TO PRESSURIZE WORKING FLUID

BACKGROUND OF THE INVENTION

1. Field of the Invention

The present invention relates to a pump device.

2. Discussion of Related Art

JP-A-8-104214 discloses a pump device including a pump, an electric motor for driving the pump, and a pressure relief valve arranged to discharge a pressurized fluid delivered from the pump to a low-pressure reservoir when the delivery pressure of the pump (pressure of the pressurized fluid) exceeds a preset relief pressure. The pressure relief valve prevents an excessive rise of the delivery pressure of the pump, thereby protecting the electric motor from an overload.

In the pump device described in the above-identified publication, the pump is kept operated so as to maintain the delivery pressure at the present relief pressure, even after the delivery pressure has been raised to the present relief pressure. This continuous operation of the pump requires a comparatively large amount of consumption of an electric energy by the electric motor to drive the pump.

SUMMARY OF THE INVENTION

It is therefore an object of the present invention to provide a pump device which is arranged to reduce the required amount of consumption of an electric energy. This object may be achieved according to any one of the following modes of the present invention, each of which numbered like the appended claims and depends from the other mode or modes, where appropriate, for easier understanding of technical features disclosed in the present application, and possible combinations of those features. However, it is to be understood that the invention is not limited to those technical features or combinations thereof, and that any one of a plurality of technical features described below with respect to any one mode of the invention may be a subject of the present invention, without the other technical feature or features being combined with that one feature.

(1) A pump device comprising a support member having a fitting recess, and a movable member which is reciprocated in said fitting recess to suck a working fluid, pressurize the fluid and deliver the pressurized fluid, the pump device comprising a movement restricting device operable to deform a wall at least partially defining the fitting recess of the support member, such that the wall is deformed toward the movable member, for restricting a reciprocating movement of the movable member in the fitting recess, at least when an amount of the pressurized fluid required to be delivered by the pump device is smaller than a nominal delivery amount of the pump device.

In the pump device according to the above mode (1) of this invention, the movement restricting device is operated, when the amount of the pressurized fluid required to be delivered by the pump device is smaller than the nominal delivery amount of the pump device, so that the wall of the support member which at least partially defines the fitting recess (such as a fitting hole or bore in a cylinder in a piston pump or a vane groove in a vane pump) is deformed toward the movable member, for restricting a reciprocating movement of the movable member in the fitting recess. For instance, the movement restricting device is arranged to inhibit or prevent the reciprocating movement of the movable member, reduce a speed of the movement, or reduce the reciprocating stroke of the movable member, when the pump device is not required to deliver the pressurized fluid. For example, the wall of the support member is elastically deformed toward the fitting recess, for zeroing the clearance between the movable member and the wall of the support member, and applying a pressing force from the wall to the movable member in a direction intersecting the direction of reciprocating movement of the movable member (e.g., in a direction perpendicular to the direction of movement). When a force of friction between the wall and the movable member which is produced on the basis of the pressing force becomes larger than a force by which the movable member is moved, the movement of the movable member is inhibited or prevented. Namely, the movable member is held stationary, with the wall held in pressing contact with the outer surface of the movable member. Alternatively, the wall of the support member is elastically deformed such that a portion of the wall projects toward the movable member, so that the projecting portion engages the movable member to limit a distance of movement of the movable member, for thereby reducing the reciprocating stroke of the movable member.

When the movement of the movable member in the fitting recess is inhibited, the pump device is not capable of delivering the pressurized fluid. In this case, the pressure of the fluid in a discharge port of the pump device in a pump chamber formed in front of the movable member is either lowered or maintained at a level before the movement is inhibited. Whether the fluid pressure is maintained or lowered depends upon a type of a fluid-operated device which is operated by the pressurized fluid delivered from the pump device, for instance. Where the fluid-operated device does not consume the pressurized fluid, the fluid pressure in the discharge port or pump chamber is maintained. Where the fluid-operated device consumes the pressurized fluid, the fluid pressure is lowered.

Where the reciprocating stroke of the movable member is reduced by the movement restricting device, the amount of the pressurized fluid delivered from the pump device during one reciprocation of the movable member is reduced. Accordingly, the rate of increase of the fluid pressure in the discharge port or pump chamber is reduced, or the fluid pressure is maintained or is lowered. Whether the rate of increase of the fluid pressure is reduced or the fluid pressure is maintained or lowered depends upon a relationship between the amount of consumption of the pressurized fluid by the fluid-operated device and the amount of the pressurized fluid delivered by the pump device.

In any case, an increase of the fluid pressure in the discharge port or pump chamber of the pump device can be restricted by the movement restricting device, so that the amount of electric energy required to move the movable member can be reduced. Further, a pressure relief valve provided in the conventional pump device is not essential, in the presence of the movement restricting device. However, the principle of the present invention does not exclude the provision of such a pressure relief valve for improving the operating safety of the pump device.

The movement restricting device may be arranged to deform either a portion or an entirety of the wall partially defining the fitting recess in the support member. Namely, the wall is required to be deformed such that the diameter of at least a portion of the wall (inside diameter of the fitting recess) is reduced to be smaller than the outside diameter of the movable member. Where the wall is deformed partially, the wall may have only one deformable portion or a plurality of deformable portions. For example, the wall has a deformable cylindrical portion which is deformed by the movement restricting device, in a direction intersecting the direction of movement of the movable member. However, the deformable portion is not limited to such a cylindrical portion of the wall.

Whether the pump device is required to deliver the pressurized fluid or not, that is, whether the movement restricting device should be operated or not, depends upon an operating condition of either the pump device per se or the fluid-operated device. For example, the movement restricting device is operated when it is not desirable to operate the pump device after the delivery pressure has reached a predetermined level, or when the fluid-operated device does not require the pressurized fluid whose pressure is higher than a predetermined level.

The principle of the present invention is applicable to a gas pump arranged to pressurize a gas, and a liquid pump arranged to pressurize a liquid. However, the present invention is more suitably applicable to the liquid pump, since a large pressing force may be applied to the wall of the support member in the liquid pump than in the gas pump.

(2) A pump device according to the above mode (1) wherein the movement restricting device includes a hydraulically operated movement restricting device operable to deform the wall, on the basis of a pressure of the pressurized fluid delivered by the pump device.

In the pump device according to the above mode (2), the wall of the support member is deformed on the basis of the pressure of the pressurized fluid delivered by the pump device. Thus, the pressurized fluid delivered by the pump device is utilized to operate the movement restricting device. In this mode, the movement restricting device does not use an exclusive drive device for causing deformation of the wall.

(3) A pump device according to the above mode (1) or (2), wherein the movement restricting device is operable to deform the wall when a pressure of the pressurized fluid delivered by the pump device becomes higher than a predetermined value.

In the pump device according to the above mode (3), it is considered that the pump device is not required to deliver the pressurized fluid, after the pressure of the pressurized fluid delivered by the pump device has exceeded the predetermined value. That is, the movement restricting device is operated to deform the wall when the pressure of the delivered pressurized fluid becomes higher than the predetermined value. In this case, the movement restricting device may be arranged to deform the wall so as to inhibit the movement of the movable member, after the delivery pressure of the pump device becomes higher than the predetermined value.

(4) A pump device according to any one of the above modes (1)–(3), wherein the movement restricting device permits the movement of the movable member when the pump device is required to deliver the pressurized fluid, and inhibits the reciprocating movement of the movable member when the pump device is not required to deliver the pressurized fluid.

In the pump device according to the above mode (4), the wall of the support member is deformed to inhibit the reciprocating movement of the movable member when the pump device is not required to deliver the pressurized fluid.

(5) A pump device according to anyone of the above modes (1)–(4), wherein the movement restricting device is operable to deform the wall for inhibiting the movement of the movable member located at a predetermined position while the pump device is not required to deliver the pressurized fluid.

The movement restricting device may be arranged to deform the wall of the support member for inhibiting the movement of the movable member when the movable member is located any desired position in the direction of the reciprocating movement of the movable member. For instance, the movement restricting device is desirably arranged to inhibit the movement of the movable member located at its fully advanced position or upper dead point.

(6) A pump device according to any one of the above modes (1)–(5), wherein the movement restricting device is operable to deform said wall to make a reciprocating stroke of said movable member smaller when the amount of the pressurized fluid required to be delivered by the pump device is smaller than the above-indicated nominal delivery amount.

The amount of the pressurized fluid to be delivered by one reciprocating movement of the movable member of the pump device is reduced by reducing the reciprocating stroke of the movable member. For instance, the reciprocating stroke of the movable member is reduced so that the amount of the pressurized fluid delivered from the pump device is substantially equal to the amount of consumption of the pressurized fluid. This arrangement reduces an increase in the delivery pressure of the pump device.

(7) A pump device according to any one of the above modes (1)–(6), wherein the support member includes a cylinder having as the above-indicated wall a cylindrical portion which partially defines a cylinder bore as the above-indicated fitting recess, and the movable member includes a piston reciprocably fitted in the cylinder bore, the cylindrical portion having an outer circumferential surface partially defining a pressure chamber which receives the pressurized fluid through a fluid-introducing portion.

In the pump device according to the above mode (7), the pressurized fluid delivered by the pump device is introduced into the pressure chamber. The cylindrical portion of the cylinder is elastically deformed when the pressure of the fluid in the pressure chamber is higher than a predetermined level. With the elastic deformation of the cylindrical portion, a clearance between the inner circumferential surface of the cylindrical portion and the outer circumferential surface of the piston is zeroed, and the cylindrical portion is forced against the outer circumferential surface of the piston. As a result, a pressing force is applied from the cylindrical portion to the piston in a direction intersecting the direction of movement of the piston. When a force of friction between the cylindrical portion and the piston on the basis of this pressing force becomes larger than a force by which the movable member is moved, the movement of the piston is inhibited. The cylindrical portion of the cylinder may be elastically deformed such that a portion of the cylindrical portion projects radially inwardly of the cylinder bore, that the projecting portion functions to limit a distance of movement of the piston. In this case, the operating stroke of the piston is reduced. The configuration and size of the projecting portion may be changed or determined by the configuration of the pressure chamber. The size and configuration of the projecting portion may be changed with an increase of the fluid pressure in the pressure chamber. Where the movable member includes an engaging portion for engagement with the projecting portion of the cylindrical portion such that the position at which the movement of the movable member is inhibited is determined by a relative position between the engaging portion and the projecting portion, a change of the size and/or configuration of the projecting portion changes the relative position of the engaging portion and the projecting portion, thereby changing the position at which the movement of the movable member is inhibited. Even where the movable member does not include an engaging portion, the force of friction between the cylindrical portion and the movable member increases with an increase of the size of the projecting portion, which results in an increase in the surface area of contact of the projecting portion with the movable member. In this case, the movement of the movable member is inhibited when the force of friction determined by the surface area of contact of the projecting portion and the movable member becomes larger than the force by which the movable member is moved.

The pressure chamber may be formed over the entire axial length of the cylindrical portion of the cylinder, or over a portion of the axial length. The pressure chamber may be formed by utilizing a gap provided between the cylindrical portion of the cylinder and a housing in which the cylinder is fixedly received. Where the cylindrical portion is relatively easily elastically deformed, the fluid pressure in the pressure chamber which is required to elastically deform the cylindrical portion is relatively low. The ease of elastic deformation is determined by the material, configuration and other factors of the cylindrical portion.

(8) A pump device according to the above mode (7) comprising: a fluid sucking portion and a fluid discharging portion which are spaced apart from each other in an axial direction of the piston; a housing in which the cylinder is fitted; and at least one sealing member disposed between the housing and the cylindrical portion of the cylinder and isolating the fluid sucking portion and said fluid discharging portion.

In the pump device according to the above mode (8), the fluid sucking portion and the fluid discharging portion are disposed such that these portions are spaced apart from each other in the axial direction of the position, and the cylinder and the housing are mutually separate members. Further, the sealing member or members is/are disposed between the cylinder and the housing, to prevent a flow of the pressurized fluid from the fluid discharging portion into the fluid sucking portion through a gap between the cylinder and the housing.

Since the cylinder is formed separately from the housing, the cylinder can be easily designed so as to permit the piston to be slidably movable in the cylinder bore in an intended manner. In other words, it is not required to design both of the housing and the cylinder, so as to permit intended slidable movement of the piston in the cylinder bore, whereby the cost of manufacture of the pump device can be reduced. In designing the cylinder, for example, the material of the cylinder must be taken into account so that the cylinder has a sufficiently high degree of wear resistance, and/or the cylinder must be manufactured so that the sliding surface of the cylinder has a low friction coefficient.

(9) A pump device according to the above mode (8), wherein the pressure chamber consists of a portion of a gap between the cylinder and the housing, which portion is located on one side of the at least one sealing member that is nearer to the fluid discharging portion.

The pump device according to the above mode (8) wherein the pressure chamber is formed by utilizing the gap between the cylinder and the housing can be manufactured with a comparatively small amount of increase of the manufacturing cost due to the provision of the movement restricting device. Where the gap between the cylinder and the housing has an opening communicating with the fluid discharging portion, this opening serves as a part of the fluid-introducing portion described above with respect to the above mode (7).

(10) A pump device according to the above mode (8) or (9), wherein the above-indicated at least one sealing member includes a sealing member located on one side of a front axial end of the piston which one side is nearer to the fluid sucking portion when the piston is located at a fully advanced position thereof on the side of the fluid discharging portion, the above-indicated front axial end being located on the side of the fluid discharging portion.

In the pump device according to the above mode (10), the movement of the piston can be inhibited with high stability at any position in the reciprocating stroke of the piston. The length of the fluid chamber in the axial direction of the piston can be increased with an increase of a distance between the sealing member and the axial end of the piston when the piston is located at its fully advanced position. For a given fluid pressure in the fluid chamber, the force to be applied from the cylindrical portion of the cylinder to the cylinder increases with an increase in the length of the fluid chamber. The fluid pressure in the pressure chamber becomes highest when the piston is moved to its fully advanced position (upper dead point). Therefore, the movement of the piston is usually inhibited when the piston is located at its fully advanced position.

(11) A pump device according to any one of the above modes (8)–(10), wherein the at least one sealing member includes a sealing member located at a position which is on one side of a midpoint between axial opposite axial ends of the piston when the piston is located at a fully advanced position thereof on the side of the fluid discharging position, the above-indicated one side of the midpoint being nearer to a fully retracted position on the side of the fluid sucking portion.

The sealing member may be located such that a distance from the position of the sealing member to the axial end of the piston on the side of the fully advanced position is at least ⅔ or ¾ of the axial length between the opposite axial ends of the piston.

The sealing member disposed between the cylinder and the housing may be located at a position on one side of the axial ends of the piston located at its fully advanced position (upper dead point), which one side is nearer to the fully retracted position (lower dead point). In this case, the movable member preferably includes a large-diameter portion serving as the piston, and a small-diameter portion serving to transmit a drive force from a drive device to the piston. The small-diameter portion may be considered to be a piston rod connected to the piston.

(12) A pump device according to any one of the above modes (7)–(11), wherein at least one of an outer circumferential surface of the cylinder and an inner circumferential surface of the housing has at least one recess each of which provides said pressure chamber.

Only the outer circumferential surface of the cylinder or only the inner circumferential surface of the housing may has at least one recess. Alternatively, both of those outer and inner circumferential surfaces have recesses. In this latter case, the recesses formed in the outer and inner circumferential surfaces may cooperate to define a single recess, or may be spaced apart from each other in the axial direction of the cylinder. In any case, at least one of the cylinder and the housing has a single recess or a plurality of recesses, which is/are easily formed. While each recess is preferably an annular recess, the recess may be an arcuate or part-circumferential recess corresponding to a part of the circumference of the above-indicated circumferential surfaces. Alternatively, the recess may be a generally elongate recess or groove formed so as to extend in the axial direction of the cylinder (piston).

Where a recess is formed in the outer circumferential surface of the cylinder, a relatively thin-walled cylindrical wall is formed radially inwardly of this recess. This thin-walled cylindrical wall is easily deformable. That is, the formation of a recess in the outer circumferential surface of the cylinder provides an easily deformable cylindrical wall serving as the wall which partially defines the fitting recess in which the piston is slidable fitted and which is deformed by the fluid pressure in the pressure chamber. The thickness of the easily deformable cylindrical wall can be changed by changing the depth of the recess.

(13) A pump device according to the above mode (7), comprising a fluid sucking portion and a fluid discharging portion which are spaced apart from each other in an axial direction of the piston, and wherein the cylinder further has an annular groove which has an annular shape in transverse cross section of the cylinder and a diameter larger than the cylinder bore, the annular groove extending in an axial direction of the cylinder and having a closed end on the side of the fluid sucking portion, and an open end on the side of the fluid discharging portion, the annular groove and the cylinder bore cooperating with each other to define therebetween the cylindrical portion serving as the above-indicated wall, the annular groove providing the pressure chamber.

In the pump device according to the above mode (13), the annular groove is formed in the cylinder of the support member, and this annular groove cooperates with the cylinder bore to define therebetween the cylindrical portion serving as the cylindrical wall to be elastically deformed. This arrangement does not require a sealing member for isolating the fluid sucking portion and the fluid discharging portion from each other.

(14) A pump device according to any one of the above mode (1)–(13), wherein the movement restricting device includes a switching device operable between a first state for permitting deformation of the above-indicated wall and a second state for inhibiting the deformation of the wall.

The switching device may include a valve device operable between a first state for permitting a flow of the pressurized fluid into said pressure chamber and a second state for inhibiting the flow.

The valve device indicated above may include an electromagnetic valve provided in a fluid passage connecting a fluid discharging portion of the pump device and said pressure chamber. The electromagnetic valve is switchable between a state for permitting the flow of the pressurized fluid from the fluid discharging portion into the pressure chamber and a sate for inhibiting this flow. The movement of the movable member can be rapidly stopped by switching the electromagnetic valve to the state for permitting the fluid flow into the pressure chamber when the fluid pressure in the fluid discharging portion has increased to a level at which the movement of the movable member can be inhibited. The electromagnetic valve is desirably switched to the state for permitting the fluid flow when the movable member has moved to its fully advanced position or upper dead point.

The valve device may include a pressure relief valve provided in the fluid passage connecting the fluid discharging portion and the pressure chamber. The pressure relief valve is arranged to inhibit the fluid flow from the fluid discharging portion into the pressure chamber when the fluid pressure in the fluid discharging portion is not higher than a predetermined relief pressure, and permits this fluid flow when the fluid pressure is higher than the relief pressure. Where the relief pressure is determined to be a level at which the movement of the movable member can be inhibited, the movement of the movable member can be inhibited as soon as the pressure relief valve is opened.

(15) A pump device according to any one of the above modes (1)–(14), wherein the movement restricting device includes a buffer device operable to reduce a change of the pressure of the pressurized fluid to be delivered by the pump device.

In the pump device according to the above mode (15), the pressure of the pressurized fluid delivered by the pump device is transmitted to the pressure chamber, with a change of the fluid pressure being reduced by the buffer device. The buffer device is effective to prevent an abrupt rise of the fluid pressure in the pressure chamber, which would take place upon an abrupt rise of the fluid pressure in the fluid discharging portion. Accordingly, the buffer device prevents an abrupt increase of the force to be applied to the movable member and the wall. The buffer device is particularly effective where the working fluid is a liquid. In other words, there is a relatively low need to provide the buffer device, where the working fluid is a compressible gaseous fluid.

The buffer device may be disposed between the fluid discharging portion and the pressure chamber, or between the fluid discharging portion and a fluid-actuator device which is operated by the pressurized fluid delivered by the present pump device. For example, the buffer device is desirably arranged to be able to accommodate the volume of the pressurized fluid that is delivered by one reciprocating movement of the movable member. The fluid-actuated device may serve as the buffer device.

(16) A pump device according to any one of the above-indicated modes (1), (4)–(6) and (14), wherein said movement restricting device includes an electromagnetically operated device which includes a coil and which produces an electromagnetic force for deforming the above-indicated wall, upon energization of said the with an electric current.

In the pump device according to the above mode (16), the wall of the support member is deformed by an electromagnetic force produced by the electromagnetically operated device. For instance, the electromagnetic force acts on the wall in a radially inward direction of the fitting force.

(17) A pump device according to any one of the above modes (1)–(16), further comprising:

a drive device operable in contact with the movable member, to advance the movable member in an advancing direction; and a biasing device biasing the movable member in a retracting direction opposite to the advancing direction, for forcing the movable member onto the drive device.

In the pump device according to the above mode (17), the movable member is advanced by the drive device, against a force based on the fluid pressure in a pump chamber, and a biasing force of the biasing device. When the drive force produced by the drive device does not act on the movable member after the movable member has been advanced to its fully advanced position or upper dead point. Accordingly, the movable member is retracted from the fully advanced position, by the biasing force of the biasing device. After the movable member has been retracted to its fully retracted position or lower dead point, the movable member is again advanced by the drive force produced by the drive device. The biasing device is desirably arranged to hold the movable member in pressing contact with the drive device.

The biasing force Fs of the biasing device is smaller than the drive force Fd produced by the drive device. Namely, Fs<Fd. Accordingly, when the friction force Ff acting on the movable member based on the deformation of the wall of the support member becomes larger than the biasing force Fs, that is, when Ff>Fs, the retracting movement of the movable member is inhibited by the friction force, in the absence of the drive force acting on the movable member. As a result, the movement of the movable member is eventually inhibited at the fully advanced position. It is also noted that the pressure of the pressurized fluid delivered by the pump device is the highest when the movable member is located at its fully advanced position. Accordingly, the movable member is held stationary at the fully advanced position with high stability, where the movement restricting device is arranged to restrict the movement of the movable member on the basis of the pressurized fluid delivered by the pump device. Where the movement restricting device is arranged to restrict the movement of the movable member on the basis of an electromagnetic force as described above with respect to the above mode (16), the movement of the movable member can be inhibited at any desired position, by controlling the amount of electric current to be applied to the coil of the electromagnetically operated device so that the friction force based on the electromagnetic force is larger than the biasing force of the biasing device.

The friction force required to be applied to the movable member on the basis of the deformation of the wall for inhibiting the movement of the movable member is reduced by reducing the biasing force of the biasing device.

(18) A pump device according to any one of the above-modes (1)–(17), further comprising a drive device operable in contact with the movable member, to advance the movable member, and wherein the drive device includes a drive member not connected to the movable member.

In the pump device according to the above mode (18) wherein the drive member of the drive device is not connected to the movable member, the movable member is held stationary at the fully advanced position while the drive member is returned in the retracting direction, after the movement of the movable member is inhibited at the fully advanced position. After the movement is inhibited, therefore, a load acting on the drive device is reduced, so that the required amount of consumption of the energy by the drive device is accordingly reduced.

(19) A pump device according to any one of the above modes (1)–(18), further comprising a fluid sucking portion, and wherein the movable member partially defines a pump chamber in front of the movable member, and carries a suction valve operable between a first state for permitting a flow of the working fluid into the pump chamber through the fluid sucking portion, and a second state for inhibiting the flow of the working fluid into said pump chamber.

(20) A pump device according to the above mode (19), wherein the suction valve includes a valve seat formed on a front end face of the movable member, a valve member movable toward and away from the valve seat according to a difference between pressures of the fluid in the fluid sucking portion and the pump chamber, and a holder member for holding the valve member, the holder member having an internal dimension which is smaller at a position relatively distant from the valve seat, than at a position relatively near the valve seat.

In the pump device according to the above mode (20), the valve member is held by the holder member such that the valve member is movable toward and away from the valve seat. Further, the internal dimension of the holder member is made smaller at a position relatively distant from the valve seat. This arrangement makes it possible to reduce an amount of misalignment of the valve member with respect to the movable member in the radial direction of the movable member when the valve member is spaced apart from the valve seat. If the internal radial dimension (diameter) of the holder member were substantially constant in the axial direction, it would be necessary to provide a spring for biasing the valve member toward the valve seat, to thereby prevent radial misalignment of the valve member with respect to the movable member. In the present pump device, however, the holder member eliminates a need to provide such a spring for preventing the radial misalignment of the valve member, and assures leakage-free seating of the valve member on the valve seat even in the absence of a spring.

The internal radial dimension (diameter) of the holder member may be reduced either continuously or in steps in the axial direction away from the valve seat. In the former case, the holder member may have a tapered inner surface.

(21) A pump device according to any one of the above modes (1)–(20), wherein the movable member consists of a plurality of separate movable members which are fitted in respective fitting recesses of the support member.

While the pump device may use only one movable member, the pump device usually uses a plurality of movable members, which are disposed radially, or in parallel or series with each other. The movements of all of the movable members may be inhibited at the same time. Alternatively, the movement of at least one of the movable members is inhibited at a point of time different from that at which the movement of the other movable member or members is inhibited.

(22) A pump device according to the above mode (21), wherein the movement restricting device restricts the movement of at least one of said plurality of separate movable members at a point of time different from that at which the movement of the other movable member or members is restricted.

In the pump device according to the above mode (22), the movement of at least one of the movable members is restricted at a point of time different from that at which the movement of the other movable member or members is restricted. This arrangement permits a change of the amount of the pressurized fluid to be delivered by the pump device, for a given pressure of the pressurized fluid. The pressure of the pressurized fluid can be increased, at a smaller amount of energy consumption by the pump device, when the amount of the pressurized fluid is reduced, than when the amount of the pressurized fluid is not reduced (namely, is maintained at the nominal value). In a fluid-actuated device operated by the pressurized fluid delivered by the pump device, the required amount of the pressurized fluid is usually smaller when the pressure of the pressurized fluid is relatively high than when the pressure is relatively low. The required size of the drive device for reciprocating the movable members can be made smaller where the amount of the pressurized fluid is controlled to be relatively large when the pressure of the pressurized fluid is relatively low and to be relatively small when the pressure is relatively high, than where the nominal amount of pressurized fluid is delivered irrespective of the pressure of the pressurized fluid.

Where the movements of the plurality of movable members are restricted at respective different points of time, the amount of the pressurized fluid to be delivered by the pump device can be changed in steps.

(23) A pump device according to any one of the above modes (1)–(22), comprising at least one of a piston pump and a vane pump.

The piston pump includes a plunger pump, which includes an axial plunger pump, a radial plunger pump, and double-acting plunger pump. The axial plunger pump is constructed such that a piston is reciprocated by rotation of a swash plate. The radial plunger pump includes a radial array of a plurality of pistons. The double-acting plunger pump includes a plurality of pistons arranged in parallel with each other.

Where the pump device is a vane pump, the movable member consists of a plurality of vanes slidably fitted in respective grooves formed in a rotor. During rotation of the rotor, the vanes are reciprocated within the respective grooves while the vanes are held at their end faces in sliding contact with the inner circumferential surface of a housing which accommodates the rotor. In this case, the movement restricting device is arranged to restrict or inhibit the reciprocating movements of the vanes in the grooves. When the reciprocating movements in the grooves are inhibited, the working fluid is not pressurized even while the rotor is rotated.

(24) A pump device according to any one of the above modes (1)–(23), which is provided in a braking system for a vehicle, to supply a wheel brake cylinder with the pressurized fluid, to brake a wheel of the vehicle.

(25) A pump device including a support member having a fitting recess, and a movable member which is reciprocated in said fitting recess to suck a working fluid, pressurize the fluid and deliver the pressurized fluid, said pump device comprising a movement restricting device operable to deform a wall at least partially defining the fitting recess of the support member, such that the wall is deformed inwardly of the fitting recess, for restricting a reciprocating movement of the movable member in the fitting recess, and such that an amount of deformation of the wall is larger when an amount of the pressurized fluid required to be delivered by the pump device is relatively small than when the amount is relatively large.

In the pump device according to the above mode (25), the movement restricting device may be arranged not to deform the wall when the requirement to deliver the pressurized fluid is relatively high, and to deform the wall by a predetermined constant amount when the required amount of delivery of the pressurized fluid by the pump device is smaller than the nominal delivery amount. Alternatively, the movement restricting device is arranged such that the amount of deformation of the wall changes with the required amount of delivery of the pressurized fluid by the pump device.

It is to be understood that the pump device according to the above mode (25) may incorporate the technical feature of any one of the above modes (1)–(24) described above.

(26) A pump device comprising a support member having a fitting recess, and a movable member which is reciprocated in said fitting recess to suck a working fluid, pressurize the fluid and deliver the pressurized fluid, characterized by further comprising a pressing device operable to apply a pressing force to the movable member in a direction intersecting a direction of reciprocation of the movable member, when an amount of the pressurized fluid required to be delivered by the pump device is smaller than a nominal delivery amount of the pump device.

In the pump device according to the above mode (26), a reciprocating movement of the movable member is inhibited when a force of friction acting on the movable member on the basis of the pressing force produced by the pressing force becomes larger than a force by which the movable member is moved. It will be understood that the pump device according to the above mode (26) may incorporate the technical feature according to any one of the above modes (1)–(25) described above.

(27) A pump device comprising a support member having a fitting recess, and a movable member which is reciprocated in said fitting recess to suck a working fluid, pressurize the fluid and deliver the pressurized fluid, characterized by further comprising a clamping device operable to deform a wall at least partially defining the fitting recess of the support member, such that said wall is deformed inwardly of the fitting recess, for clamping the movable member at a non-delivery position thereof, at least when an amount of the pressurized fluid to be delivered by the pump device is smaller than a nominal delivery amount of the pump device, the amount of the pressurized fluid delivered by the pump device being zero when said movable member is located at said non-delivery position.

In the pump device according to the above mode (27), the movable member is clamped at its non-delivery position when the amount of the pressurized fluid required to be delivered by pump device is smaller than the nominal delivery amount. In a piston pump device, the amount of the pressurized fluid delivered by the pump device is zero when the piston is located at its fully advanced position. In a vane pump device, the amount of pressurized fluid delivered by the pump device is zero when the vane is located at its fully retracted position on the radially inner side of the rotor. That is, the non-delivery position is the fully advanced position of the piston in the piston pump device, and the fully retracted position of the vane in the vane pump device. It will be understood that the pump device according to the above mode (27) may incorporate the technical feature according to any one of the above modes (1)–(26).

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENTS

Referring to the accompanying drawings, there will be described in detail pump devices constructed according to preferred embodiments of the present invention. The pump devices are arranged to deliver a pressurized working fluid for operating a hydraulically operated braking system for an automotive vehicle.

Figure 2:
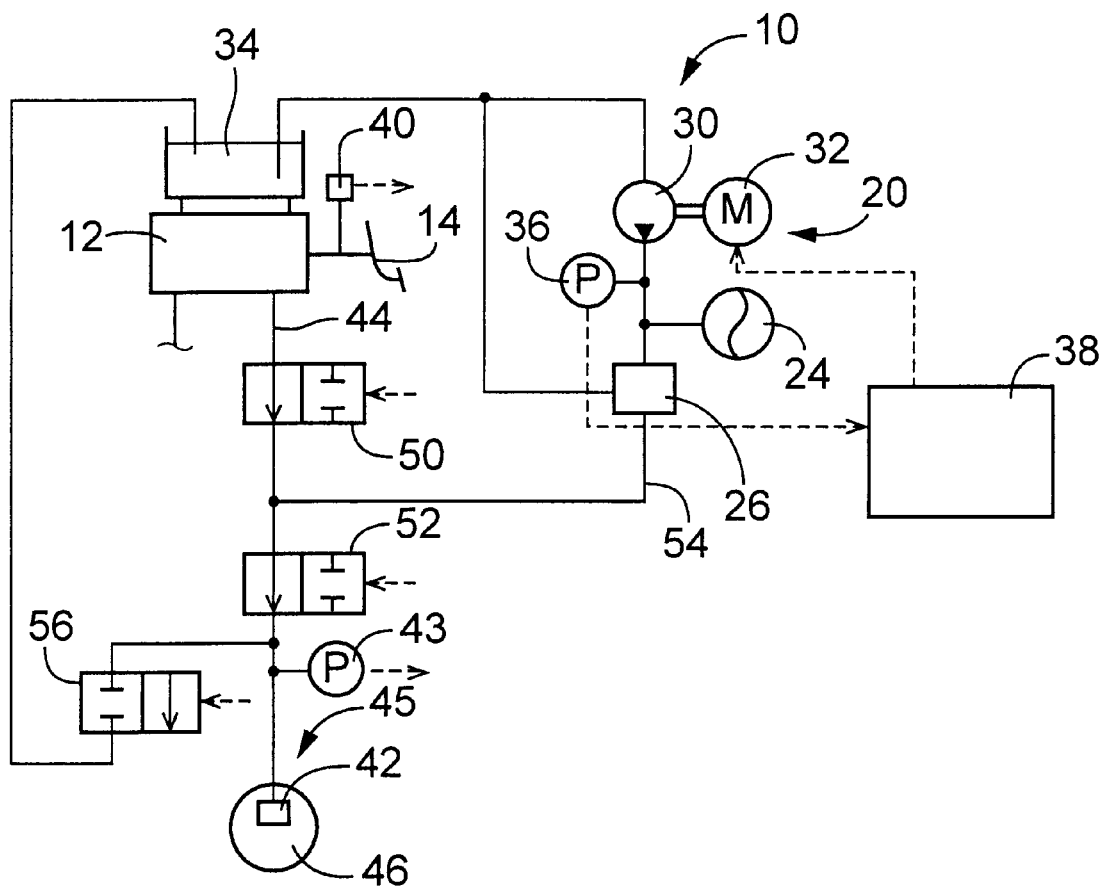
FIG. 2 is a circuit diagram relating to the braking system of FIG. 1.

Referring first to FIG. 2, reference numeral 10 denotes a power-operated hydraulic pressure source 10 while reference numeral 12 denotes a master cylinder serving as a manually operated hydraulic pressure source. The master cylinder 12 includes a pressurizing piston operatively connected to a manually operable brake operating member in the form of a brake pedal 14. The pressurizing piston, which partially defines a pressurizing chamber on its front side, is advanced to pressurize a working fluid in the pressurizing chamber, to a level corresponding to an operating state of the brake pedal 14.

The power-operated hydraulic pressure source 10 includes a pump device 20, an accumulator 24, and a pressure control valve device 26. The pump device 20 includes a pump 30 and a pump drive motor 32 operable to drive the pump 30. The pump 30 is arranged to pressurize the working fluid received from a fluid supply drive in the form of a reservoir 34, and deliver the pressurized fluid. The accumulator 24 is provided to store a mass of the pressurized fluid delivered from the pump 30. The pump drive motor 32 is controlled by a control device 38 such that the pressure of the pressurized fluid stored in the accumulator 24 is held within a predetermined range. The control device 38 is principally constituted by a computer. Described more specifically, the control device 38 turns off the pump drive motor 32 when the pressure in the accumulator 24 reaches an upper limit of the predetermined range, and turns on the motor 32 when the pressure falls below a lower limit of the predetermined range. The pressure of the working fluid stored in the accumulator 24 is detected by a hydraulic pressure sensor 36.

The pressure control valve device 26 is arranged to control the output pressure of the power-operated hydraulic power source 10. In the present embodiment, the pressure control valve device 26 is controlled such that the output pressure corresponds to the operating state of the brake pedal 14 operated by the vehicle operator. The control device 38 includes an input portion to which are connected an operating-force sensor 40 and a braking-pressure sensor 43. The operating-force sensor 40 is arranged to detect an operating force acting on the brake pedal 14, while the braking-pressure sensor 43 is arranged to detect the fluid pressure in a wheel brake cylinder 42. The control device 38 controls the pressure control valve device 26 such that the fluid pressure detected by the braking-pressure sensor 43 corresponds to the operating force detected by the operating-force sensor 40. The pressure control device 26 may include a linear pressure control valve or at least one solenoid-operated shut-off valve. The linear pressure control valve is constructed such that a pressure difference across the valve corresponds to an amount of electric current applied thereto. The operating-force sensor 40 may be replaced by an operating-stroke sensor arranged to detect an operating stroke of the brake pedal 14, as the operating state of the brake pedal 14.

A fluid passage 44 is connected at its opposite ends to the master cylinder 44 and a wheel brake cylinder 42 of a hydraulically operated brake 45. The brake 45 is activated with the pressurized fluid supplied to the wheel brake cylinder 42, for braking a wheel 46 of the automotive vehicle. The fluid passage 44 is provided with a master-cylinder cut-off valve 50 and a pressure holding valve 52. A fluid passage 54 is connected at one of its opposite ends to the power-operated hydraulic pressure source 10 and at the other end to a portion of the fluid passage 44 between the master-cylinder cut-off valve 50 and the pressure holding valve 52. A pressure reducing valve 56 is provided between the wheel brake cylinder 42 and the reservoir 34. The master-cylinder cut-off valve 50, pressure holding valve 52 and pressure reducing valve 56 are controlled according to control signals generated by the control device 38. The pressure holding valve 52 and the pressure reducing valve 56 are controlled to maintain an amount of slip of the wheel 46 within a predetermined optimum range.

When the brake pedal 14 is operated, the master-cylinder cut-off valve 50 is switched to a closed state, so that the pressure control valve device 26 is controlled while the wheel brake cylinder 42 is disconnected from the master cylinder 12. The wheel brake cylinder 42 is supplied with the pressurized fluid which is delivered from the power-operated hydraulic pressure source 10 such that the pressure of the pressurized fluid corresponds to the operating force of the brake pedal 14, so that the brake 45 is activated. In this case, the pressure holding and reducing valves 52, 56 are held in their original positions of FIG. 1.

The pressure of the fluid in the wheel brake cylinder 42 can be controlled by controlling the pump drive motor 32. In this case, the pressure control valve device 26 and the accumulator 24 are not essential. The pressure of the fluid in the wheel brake cylinder 42 can also be controlled by controlling the pressure holding and reducing valves 52, 56.

Figure 1:
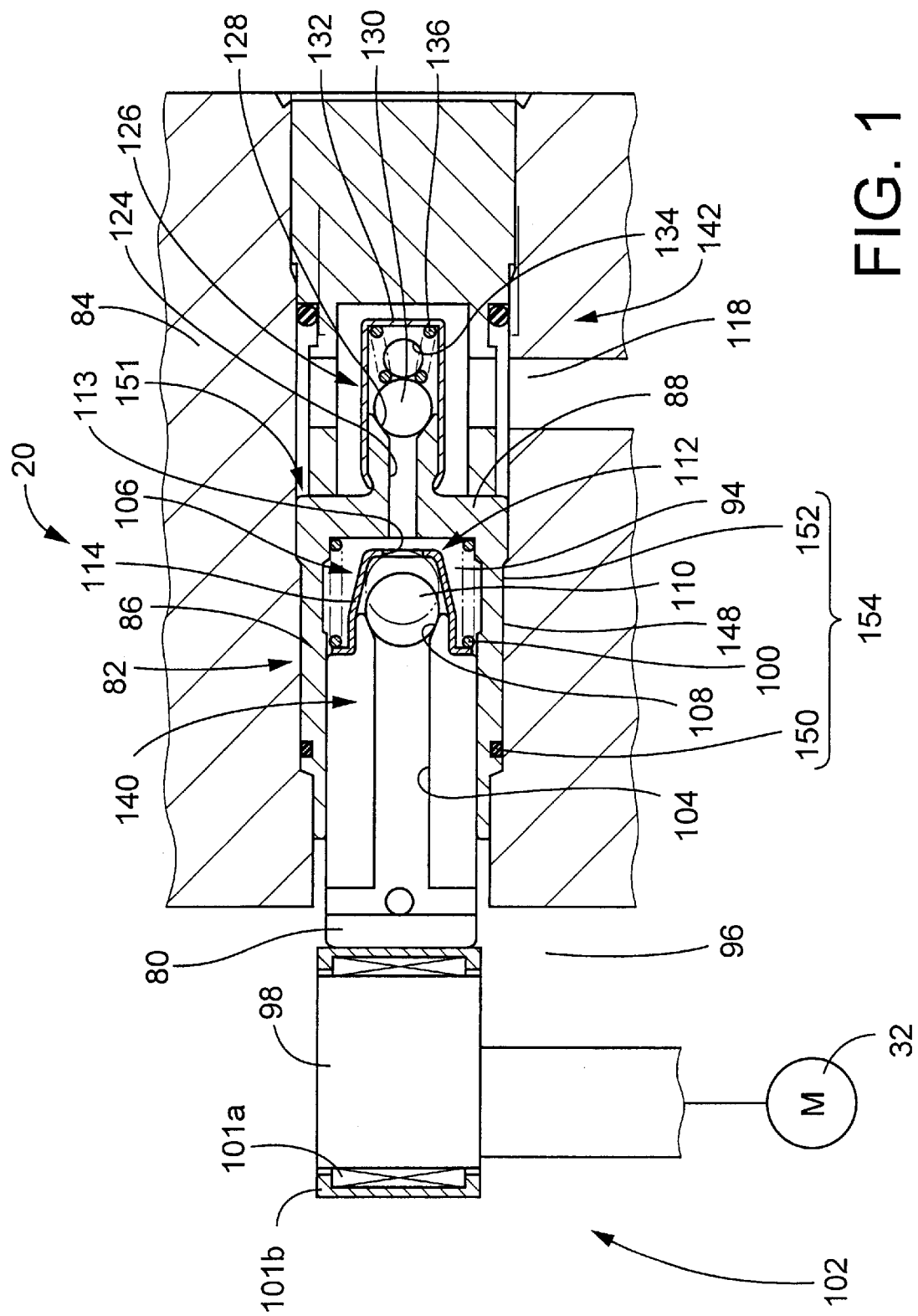
FIG. 1 is a view showing a hydraulically operated braking system incorporating a pump device constructed according to one embodiment of this invention.

As shown in FIG. 1, the pump 30 of the pump device 20 is a piston pump (plunger pump) including a movable member in the form of a piston 80, and a support member in the form of a cylinder 82 having a fitting recess in the form of a fitting hole in which the piston 80 is axially slidably fitted. The cylinder 82 is fixed to a housing 84 such that the cylinder 82 is not axially movable relative to the housing 84. In the present embodiment, the housing 84 and the cylinder 82 are mutually separate members, and the cylinder 82 is formed of a material suitable for permitting the piston 80 to be slidable in the cylinder 82. The cylinder 82 is open at one of its opposite ends and closed at the other end, including a cylindrical portion 86 and a bottom portion 88. The piston 80 is slidable on the inner circumferential surface of the cylindrical wall of the cylindrical portion 86.

One of the opposite end portions of the piston 80 partially defines a pump chamber 94 on a high-pressure side of the pump device 20, while the other end portion partially defines a fluid chamber 96 on a low-pressure side of the pump device 20. The fluid chamber 96 is held in communication with the reservoir 34. The end face of the above-indicated other end portion of the piston 80 is opposed to an eccentric cam 98 rotatable by the pump drive motor 32, and the piston 80 receives at the above-indicated one end portion a biasing force of a spring 100 which functions as a biasing device. A roller 101b is fitted on the outer circumferential surface of the eccentric cam 98 via a bearing 101a such that the roller 101b is rotatable relative to the eccentric cam 98 and such that the above-indicated end face of the piston 80 can be placed in rolling contact with the roller 101b.

During rotation of the eccentric cam 98 by the pump drive motor 32, the piston 80 is axially reciprocated in rolling contact with the roller 101b under a biasing force of the spring 100. The piston 80 is held in contact with the roller 101b, except when a movement of the piston 80 is prevented by a piston-movement restricting device 154 which will be described. In the present embodiment, the pump drive motor 32, eccentric cam 98 and roller 101b cooperate with each other to constitute a drive device 102 operable to reciprocate the piston 80.

The piston 80 has a suction passage 104 formed therethrough in a substantially axial direction. The suction passage 104 is provided with a suction valve 106. The suction valve 106 includes a valve seat 108, a valve member 110 movable toward and away from the valve seat 108, and a holder member 112 for holding the valve member 110. The suction passage 104 of the piston 80 is open in the valve seat 108, at one of its opposite ends which is located on the side of the pump chamber 94. The holder member 112 has an opening 113 which permits a flow of the working fluid from the suction passage 104 into the pump chamber 94. The valve member 110 is held by the holder member 112 such that the valve member 110 is movable in opposite directions toward and away from the valve seat 108.

The holder member 112 includes a tapered portion 114 having a tapered surface the inside diameter of which decreases in an axial direction from the fluid chamber 96 toward the pump chamber 94. The valve member 110 is moved away from the valve seat 106, permitting the fluid flow into the pump chamber 94 when the fluid pressure in the suction passage 104 becomes higher than that in the pump chamber 94. In this case, the tapered portion 114 of the holder member 112 is effective to prevent misalignment of the valve member 110 in the radial direction of the piston 80 with respect to the suction passage 104 while the valve member 110 is spaced apart from the valve seat 108. Namely, the valve member 110 is held in contact with the tapered inner surface of the tapered portion 114. The valve member 110 is seated on the valve seat 108 when the fluid pressure in the pump chamber 94 becomes higher than that in the suction passage 104. In this case, the valve member 110 can be seated on the valve seat 108 without misalignment in the radial direction of the piston 80, owing to the tapered holder member 112. Thus, the holder member 112 having the tapered portion 114 prevents the misalignment of the valve member 110 in the radial direction, even in the absence of a spring for biasing the valve member 110 toward the valve seat 108.

The pump device 20 has a discharge passage 118 connected to the pump chamber 94 through a fluid passage 124 which is formed through the bottom portion 88 of the cylinder 82. The fluid passage 124 is provided with a discharge valve 126, which includes a valve seat 128, a valve member 130 movable toward and away from the valve seat 128, and a holder member 132 for holding the valve member 130. The fluid passage 128 of the cylinder 82 is open in the valve seat 128, at one of its opposite ends which is remote from the pump chamber 94. The holder member 132 is fixed to an end part of the bottom portion 88 of the cylinder 82, and has at least one hole 134 formed therethrough. A spring 136 is disposed between the holder member 132 and the valve member 130, for biasing the valve member 130 toward the valve seat 128.

The valve member 130 is moved away from the valve seat 128 to permit the fluid flow from the pump chamber 94 into the discharge passage 118 through the discharge valve 126 and the hole or holes 134, when the fluid pressure in the pump chamber 94 becomes higher than that in the discharge passage 118, by more than an amount corresponding to a preload of the spring 136. The pressurized fluid discharged from the discharge passage 118 is fed into the accumulator 24.

In the present embodiment, the suction passage 104, the suction valve 106, etc. constitute a fluid sucking portion 140 for sucking the working fluid, while the fluid passage 124, the discharge valve 126, the discharge passage 118, etc. constitute a fluid discharging portion 142 for discharging the pressurized fluid. The fluid sucking portion 140 and the fluid discharging portion 142 are spaced apart from each other in the axial direction of the piston 80. Thus, the low-pressure side and the high-pressure side of the pump device 20 are spaced apart from each other in the axial direction.

Between the cylinder 82 and the housing 84 of the pump device 20 according to the present embodiment, there is formed a gap 148. A sealing member in the form of an O-ring 150 is provided at one of axially opposite ends of the gap 148, to prevent a flow of the pressurized fluid in the axial direction from the pump chamber 94 on the high-pressure side toward the fluid chamber 96 on the low-pressure side. The gap 148 has an opening 151 communicating with the discharge passage 118. In the presence of the gap 148, there is formed a pressure chamber in the form of a fluid chamber 152 between the O-ring and the opening 151. In this arrangement, the pressurized fluid is fed from the discharge passage 118 into the fluid chamber 152 through the opening 151. Thus, the opening 151 serves as a fluid introducing portion for introducing the pressurized fluid into the fluid chamber 152. It will also be understood that the fluid chamber 152, O-ring 150 cylindrical portion 86, etc. cooperate to each other to constitute a piston-movement restricting or limiting device 154 operable to restrict or limit a retracting movement of the piston 80 toward the fluid chamber 96, as described below in detail.

There will be described an operation of the pump device 20 constructed as described above. The piston 80 is reciprocated when the eccentric cam 98 is rotated by the pump drive motor 32.

The piston 80 has a fully retracted position at which the piston has the largest distance of projection from the cylinder 82. This fully retracted position may be referred to as a "lower dead point" which defines a suction end of the sucking stroke of the piston 80. In this sucking stroke, the piston 80 is retracted while the corresponding end face of the piston 80 is held in pressing contact with a rotary member in the form of the roller 101b fitted on the eccentric cam 98, under the biasing force of the spring 100. Since the fluid pressure in the suction passage 104 becomes higher than that in the pump chamber 94 in the sucking stroke of the piston 80, the suction valve 106 is opened, permitting the working fluid to flow from the suction passage 104 into the pump chamber 94 through the opened suction valve 106. After the piston 80 has reached the lower dead point, the position 80 is advanced by the eccentric cam 98, against the biasing force of the spring 100. As a result, the volume of the pump chamber 94 is reduced to increase the fluid pressure in the pump chamber 94, and the valve member 110 of the suction valve 106 is seated on the valve seat 108, with the pressurized fluid in the pump chamber 94, so that the suction valve 106 is closed.

The piston 80 has a fully advanced position, which may be referred to as an "upper dead point" which defines a discharge end of the discharging or pressurizing stroke of the piston 80 at which the pump chamber 94 has the smallest volume and the highest fluid pressure throughout the reciprocating motion of the piston 80. The discharge valve 126 is opened, permitting the pressurized fluid to be discharged from the pump chamber 94 into the discharge passage 118 through the opened discharge valve 126, when the fluid pressure in the pump chamber 94 becomes higher than that in the discharge passage 118 by more than an amount corresponding to a biasing force of the spring 136.

The piston 80 has reached its upper dead point (fully advanced position) when the point of contact of the roller 101b with the end face of the piston 80 has the largest radial distance from the axis of rotation of the eccentric cam 98. The advancing movement of the piston 80 by the drive device 102 is terminated, and the retracting movement of the piston 80 under the biasing action of the spring 100 is initiated. The retracting movement to the fully retracted position is effected while the eccentric cam 98 is rotated, with the piston 80 being held in pressing contact with the roller 101b. The piston 80 is repeatedly reciprocated so as to pressurize the working fluid received from the reservoir 34 and deliver the pressurized fluid to the accumulator 24.

When the pressurized fluid is discharged from the discharge passage 118, the pressure of the pressurized fluid in the discharge passage 118 is also applied to the fluid chamber 152, and acts on the cylindrical portion 86 of the cylinder 82, so that the cylindrical portion 86 is elastically deformed in the radially inward direction toward the pump chamber 94. With a resulting decrease in the diameter of the cylindrical portion 86, the amount of clearance between the inner circumferential surface of the cylindrical portion 86 and the outer circumferential surface of the piston 80 is accordingly reduced. When the clearance is zeroed and the cylindrical portion 86 is forced against the piston 80 in the radial direction, a clamping force acts on the piston 80 in the radially inward direction, causing a force of friction between the cylindrical portion 86 and the piston 80. When this friction force becomes larger than the biasing force of the spring 100, the retracting movement of the piston 80 by the biasing force of the spring 100 is inhibited. Since the fluid pressure in the fluid chamber 152 is increased as the piston 80 is advanced, the force of friction between the piston 80 and the cylindrical portion 86 is increased in the discharging or pressurizing stroke of the piston 80. In the pressurizing stroke, however, the piston 80 is advanced by pressing by the eccentric cam 98, against the friction force, so that the piston 80 is necessarily moved to its fully advanced position or upper dead point. While this friction force is required to be larger than the biasing force of the spring 100 so that the retracting movement of the piston 80 can be inhibited by the friction force, the required friction force may be made relatively small where the biasing force of the spring 100 is set to be relatively small. In this case, the advancing movement of the piston 80 against the force of friction between the outer circumferential surface of the piston 80 and the inner circumferential surface of the cylindrical portion 86 does not cause a practically undesirable wear of those circumferential surfaces.

The friction force produced by the elastic deformation of the cylindrical portion 86 based on the fluid pressure in the fluid chamber 152 when the piston 80 is at its upper dead point may be smaller than the biasing force of the spring 100. In this case, the piston 80 is retracted by a certain distance, that is, until the biasing force of the spring 100 is reduced as a result of the retracting movement of the piston 80, to a value smaller than the friction force. Namely, the piston 80 is stopped at a certain point in the sucking stroke, and is held at this point for a certain length of time while the eccentric cam 98 is rotated without the roller 101b contact the piston 80. Upon expiration of the length of time, the roller 101b again contacts the piston 80, causing the piston 80 to be advanced from the above-indicated point toward the upper dead point or fully advanced position, so that the fluid pressure in the fluid chamber 152 is raised to increase the friction force. Accordingly, the piston 80 is stopped in the next sucking stroke, at a point which is nearer to the upper dead point than the point at which the piston 80 was stopped in the previous sucking stroke. If this new point of stopping is the upper dead point, the pump device 20 does not deliver the pressurized fluid. If the new point of stopping is not the upper dead point, the piston 80 is repeatedly advanced toward the upper dead point as described above, so that the piston 80 is eventually stopped at the upper dead point. The fluid pressure in the fluid chamber 152 at which the retracting movement of the piston 80 is inhibited by the friction force is determined by various factors such as: the outside and inside diameters of the cylindrical portion 86 of the cylinder 82; the material of the cylindrical portion 86 (which determines the amount of its elastic deformation by the fluid pressure); the amount of clearance between the cylindrical portion 86 and the piston 80; the preload of the spring 100; and the position of the O-ring 150 (length of the fluid chamber 152 in the axial direction of the piston 80). In the present embodiment, at least one of the above-indicated factors is determined such that the retracting movement of the piston 80 is inhibited by the friction force when the pressure of the pressurized fluid discharged from the discharge passage 118, that is, the fluid pressure in the fluid chamber 152 is equal to a predetermined value (for example, selected within a range between 14 MPa and 20 MPa). The predetermined value of the fluid pressure in the fluid chamber 152 at which the retracting movement of the piston 80 is inhibited is determined to be higher by a suitable amount than the upper limit of the fluid pressure in the accumulator 24. In this respect, it is noted that the upper limit of the fluid pressure in the accumulator 24 is determined such that the accumulator 24 can accommodate a comparatively small amount of the pressurized fluid even after the fluid pressure in the accumulator 24 has reached the upper limit. This arrangement prevents an excessive rise of the fluid pressure in the fluid chamber 152 and a consequent excessive increase of the force of friction between the cylindrical portion 86 and the piston 80, which would take place due to a sudden rise of the fluid pressure in the discharge passage 118 in the advancing movement of the piston 80.

When the piston 80 is located at its upper dead point (fully advanced position), the piston 80 no longer receives from the eccentric cam 98 a force that causes the piston 80 to be moved in the advancing direction, as described above. While the piston 80 is held at its upper dead point, therefore, the pump drive motor 32 is required to merely rotate the eccentric cam 98, so that the load acting on the motor 32 is considerably reduced, resulting in an accordingly reduced amount of consumption of the electric energy by the motor 32.

Further, the pump 30 is held in the non-operated or off state while the piston 80 is held at the upper dead point by the friction force generated by the piston-movement restricting device 154. In this case, the fluid pressure in the discharge passage 118 is lowered as the pressurized fluid in the accumulator 24 is consumed, and is maintained while the pressurized fluid in the accumulator 24 is not consumed. Even if the pump drive motor 32 cannot be turned off due to some abnormality of the hydraulic pressure sensor 36 or the control device 38, when the fluid pressure in the accumulator 24 is higher than the upper limit, the reciprocating movement of the piston 80 can be inhibited by the piston-movement restricting device 154, thereby making it possible to avoid an excessive rise of the pressure of the pressurized fluid delivered from the pump device 20. Accordingly, the present pump device 20 does not require a pressure relief valve provided in the conventional pump device, and is accordingly available at a reduced cost. The pressure relief valve provided in the conventional pump device is either incorporated within the pump of the pump device, or disposed outside the pump. In the latter case, a piping is required for connecting the pressure relief valve to the pump. The present pump device 20 requires neither the pressure relief valve nor this piping.

However, the pump device 20 may use a pressure relief valve, to further improve the operating reliability. In this case, the fluid pressure at which the retracting movement of the piston 80 is inhibited is selected to be lower than the relief pressure of the pressure relief valve, so that the movement of the piston 80 is inhibited by the piston-movement restricting device 154 if the fluid pressure in the accumulator 24 becomes higher than the upper limit due to abnormality of the hydraulic pressure sensor 36 or the control device 38. This arrangement prevents an excessive rise of the delivery pressure of the pump device 30 while avoiding unnecessary consumption of the electric energy. If the piston-movement restricting device 154 is inoperable by any chance, the pressure relief valve prevents an excessive rise of the delivery pressure of the pump device 20, thereby assuring a high degree of operating reliability of the pump device 20.

When the biasing force of the spring 100 becomes larger than the friction force due to a decrease in the fluid pressure in the discharge passage 118 while the movement of the piston 80 is inhibited by the friction force, the piston 80 is retracted toward the lower dead point or fully retracted position by the biasing force of the spring 100, and is then advanced by the rotation of the eccentric cam 98. Thus, the pump 30 is placed in the operated state.

The pump device 20 according to the present embodiment is further advantageous in that the pump 30 has a comparatively small radial dimension, owing to the arrangement of the sucking and discharging portions 140, 142 on the respective opposite sides of the piston 80 in the axial direction.

Although the present embodiment is arranged such that the fluid pressure at which the retracting movement of the piston 80 is inhibited is higher than the upper limit of the fluid pressure in the accumulator 24, this fluid pressure may be set to be equal to the upper limit. In this instance, the fluid pressure in the accumulator 24 is maintained at a level near its upper limit by the piston-movement restricting device 154, so that the pump drive motor 32 need not be controlled by the control device 38 on the basis of the fluid pressure detected by the hydraulic pressure sensor 36. For instance, the pump drive motor 32 is controlled to be held in the operated state as long as an operation of the brake pedal 14 is detected by a suitable brake switch provided to detect the operation of the brake pedal 14. When the delivery pressure of the pump device 20 has reached the upper limit in this case, the movement of the piston 80 is inhibited by the piston-movement restricting device 154, so that an excessive rise of the delivery pressure and the wasting of the electric energy by the pump drive motor 32 can be avoided. The operating-force sensor 40 may be used in place of the brake switch indicated above, since the detected operating force of the brake pedal 15 larger than a predetermined threshold indicates an operation of the brake pedal 14.

However, the above-indicated arrangement to control the pump drive motor 32 on the basis of the output signal of the brake switch may be modified to turn off the pump drive motor 32 when an amount of electric current flowing through the pump drive motor 32, which is detected by a current sensor, is lowered below a predetermined threshold while the operation of the brake pedal 14 is detected by the brake switch. The detected amount of electric current lower than the threshold indicates that the movement of the piston 80 is inhibited by the piston-movement restricting device 154. Described more specifically, the pump drive motor 32 is turned on for a short time to determine whether the amount of electric current of the motor 32 is larger than the threshold, when the following two conditions are satisfied, that is, when the operation of the brake pedal 14 is detected by the brake switch and when a predetermined first time has passed. This first time may be a shortest time during which the fluid pressure in the accumulator 24 can be lowered from the upper limit down to the lower limit. If it is determined that the amount of electric current of the motor 32 is larger than the threshold, the operation of the motor 32 is continued. If it is determined that the amount of electric current is not larger than the threshold, the motor 32 is intermittently operated for a predetermined second time shorter than the predetermined first time, as long as the operation of the brake pedal 14 is detected by the brake switch. In this control arrangement, the required amount of consumption of the electric energy by the pump 32 can be made smaller than in the arrangement in which the motor 32 is kept operated as long as the brake pedal 14 is operated.

The pump device 20 according to the present embodiment may be used in a power-operated hydraulic pressure source which does not include the accumulator 24. In this case, a buffer device is desirably disposed between the discharge passage 118 and the fluid chamber 152, or connected to the discharge passage 118 or fluid passage 54. The buffer device is arranged such that the volume of the fluid that can be accommodated in this buffer device is larger than a volume of the pressurized fluid delivered from the pump device 20 during one reciprocating movement of the piston 80. The buffer device functions to reduce the rate of change of the fluid pressure in the discharge passage 118, making it possible to prevent an abrupt rise of the fluid pressure in the fluid chamber 152 in the advancing movement of the piston 80, thereby avoiding a practically undesirable wear of the outer circumferential surface of the piston 80 and the inner circumferential surface of the cylindrical portion 86. Where the fluid pressure in the wheel brake cylinder 42 is controlled by controlling the pressure reducing valve 56 while holding the pressure holding valve 52 in the open state, the wheel brake cylinder 42 may function as a buffer device. In this case, an excessive rise of the fluid pressure in the fluid chamber 152 can be avoided without using the accumulator 24 or the buffer device.

The amount of the gap 148 between the cylindrical portion 86 and the housing 94 may be reduced when at least one groove is formed in the outer circumferential surface of the cylindrical portion 86 so as to extend in the axial direction. The reduction of the gap 148 permits an increased degree of positioning accuracy of the cylinder 82 with respect to the housing 84.

While the pump device 20 according to the present embodiment includes only one piston 80, the pump device 20 may be modified to include a plurality of pistons 80. In this case, the movements of the pistons 80 may be inhibited at the same time, or at respective different times. The pump 30 of the modified pump device may be a radial plunger pump in which the plurality of pistons 80 are arranged radially, or a pump in which the pistons 80 are disposed in parallel with each other.

Figure 3:
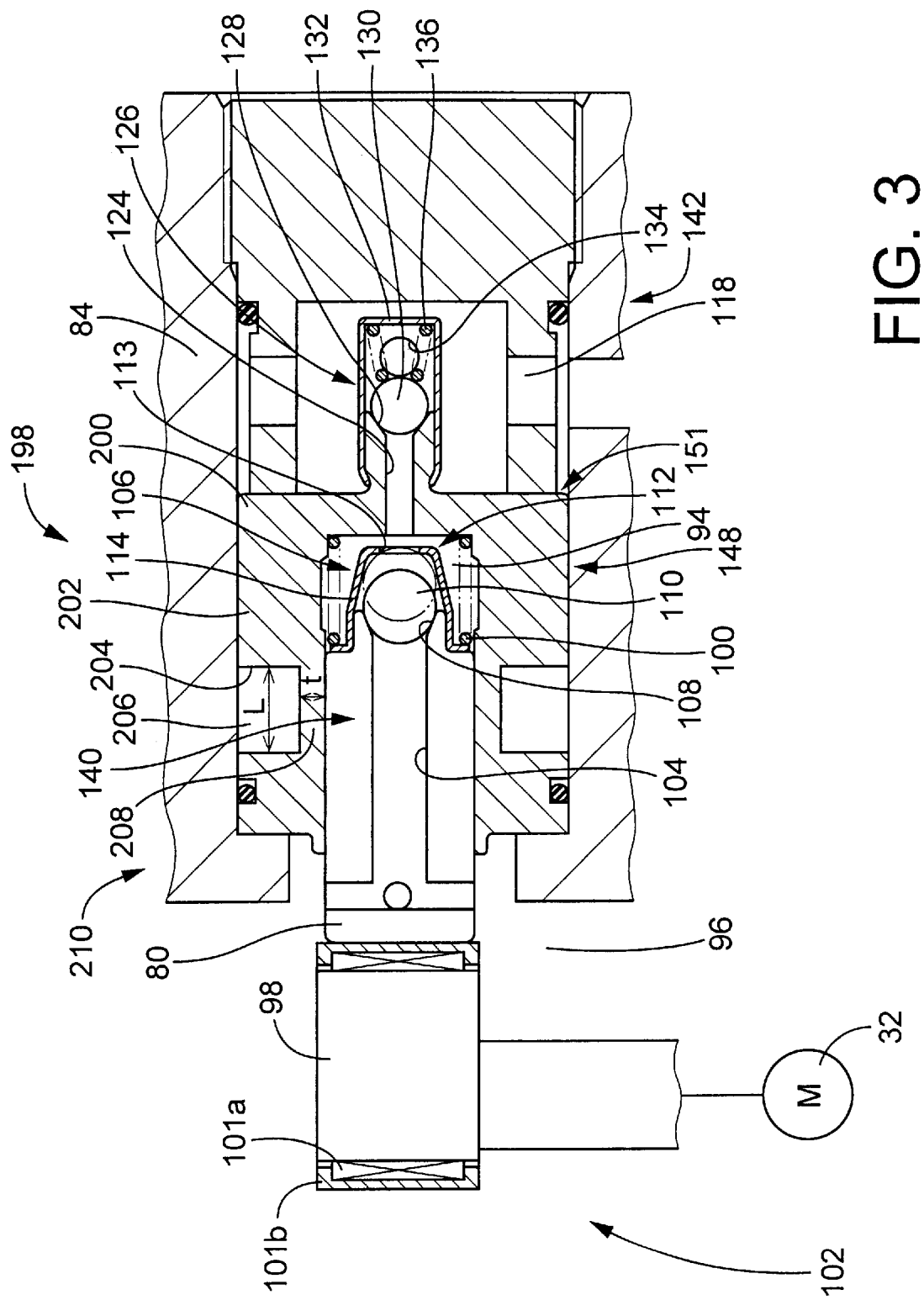
FIG. 3 is a view partly in cross section of a pump device according to another embodiment of the invention.

Referring next to FIG. 3, there will be described a pump device 198 constructed according to a second embodiment of this invention. This pump device 198 includes a cylinder 200 having a cylindrical portion 202 which has an annular recess 204 formed in its outer circumferential surface. The annular recess 204 cooperates with the inner circumferential surface of the housing 84 to define a fluid chamber 206, which is held in communication with the discharge passage 118 through the gap 148 formed between the cylinder 200 and the housing 84. In this embodiment, too, the gap 148 has the opening 151 at one end thereof. In the presence of the annular recess 204, the wall thickness of the cylindrical portion 202 is reduced at an axial section corresponding to the annular recess 204, so that the cylindrical portion 202 is given a cylindrical wall 208 which has a comparatively small thickness and which is comparatively easily elastically deformable in the radial direction. The cylindrical wall 208 may be considered to be an elastically deformable portion. In the present second embodiment, the annular recess 204 (fluid chamber 206), cylindrical wall 208 (cylindrical portion 202), etc. cooperate with each other to constitute a piston-movement restricting device 210.

The cylindrical wall 208 is elastically deformed in the radial inward direction when the fluid pressure in the fluid chamber 206 becomes higher than a certain threshold. When the clearance is zeroed and the cylindrical wall 208 is forced against the piston 80 in the radial direction, a clamping force acts on the piston 80 in the radially inward direction, causing a force of friction between the cylindrical wall 208 and the piston 80. When this friction force becomes larger than the biasing force of the spring 100, the retracting movement of the piston 80 by the biasing force of the spring 100 is inhibited. The flexibility of the cylindrical wall 208 increases with an increase in a length L of the annular recess 204 and a decrease in a thickness t of the cylindrical wall 208. Accordingly, the fluid pressure in the fluid chamber 206 at which the retracting movement of the piston 80 is inhibited by the friction force decreases with an increase in the length L and a decrease in the thickness t.

As described above, the provision of the annular recess 204 in the outer circumferential surface of the cylinder 200 makes it possible to inhibit the retracting movement of the piston 80 when the fluid pressure in the discharge passage 118 is comparatively low. It is noted that the annular recess 204 can be comparatively easily formed in the outer circumferential surface of the cylinder 200

The recess 204 need not be annular, but may be an arcuate or part-circumferential recess, or may be may be formed so as to extend in the axial direction of the piston 80. The single recess 204 may be replaced by a plurality of recesses. Further, the configuration of the recess 204 is not limited to that shown in FIG. 3. By suitably shaping the recess 204 (the wall defining the bottom of the recess 204), the cylindrical portion 202 may be given an axial portion which is comparatively easily deformable, and an axial portion which is less deformable.

Figure 4:
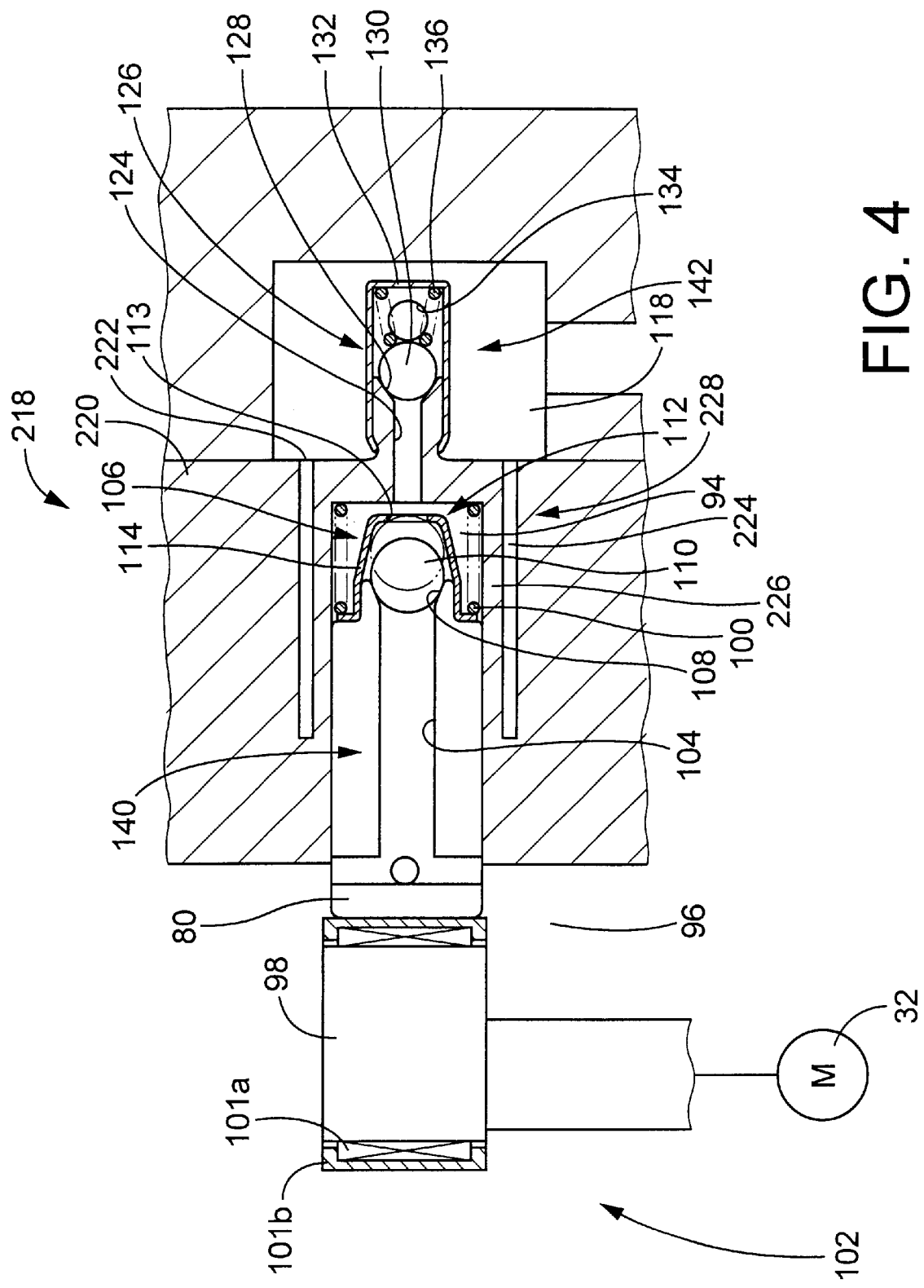
FIG. 4 is a view partly in cross section of a pump device according to a further embodiment of the present invention.

Referring to FIG. 4, there will be described a pump device 218 constructed according to a third embodiment of the present invention. In this pump device 216, a cylinder and a housing are formed integrally with each other. Namely, the pump device 216 includes a support member in the form of a housing 220 having an annular groove 224 which is open at one of its axially opposite ends, as indicated at 222, in the axial end face of the housing 220 on the discharge side and is closed at the other end remote from the opening 222. The annular groove 224 functions as a fluid chamber, and defines a cylindrical portion 226 on its radially inner side. The cylindrical portion 226 is elastically deformable with the fluid pressure in the annular groove or fluid chamber 224. In the present embodiment, the annular groove 224, cylindrical portion 226, etc. cooperate with each other to constitute a piston-movement restricting device 228.

The groove 224 need not be annular, provided that the groove 224 extend in the axial direction of the piston 80. The annular groove 224 may be replaced by a plurality of axially extending grooves which are spaced apart from each other in the circumferential direction of the piston 80.

Figure 5:
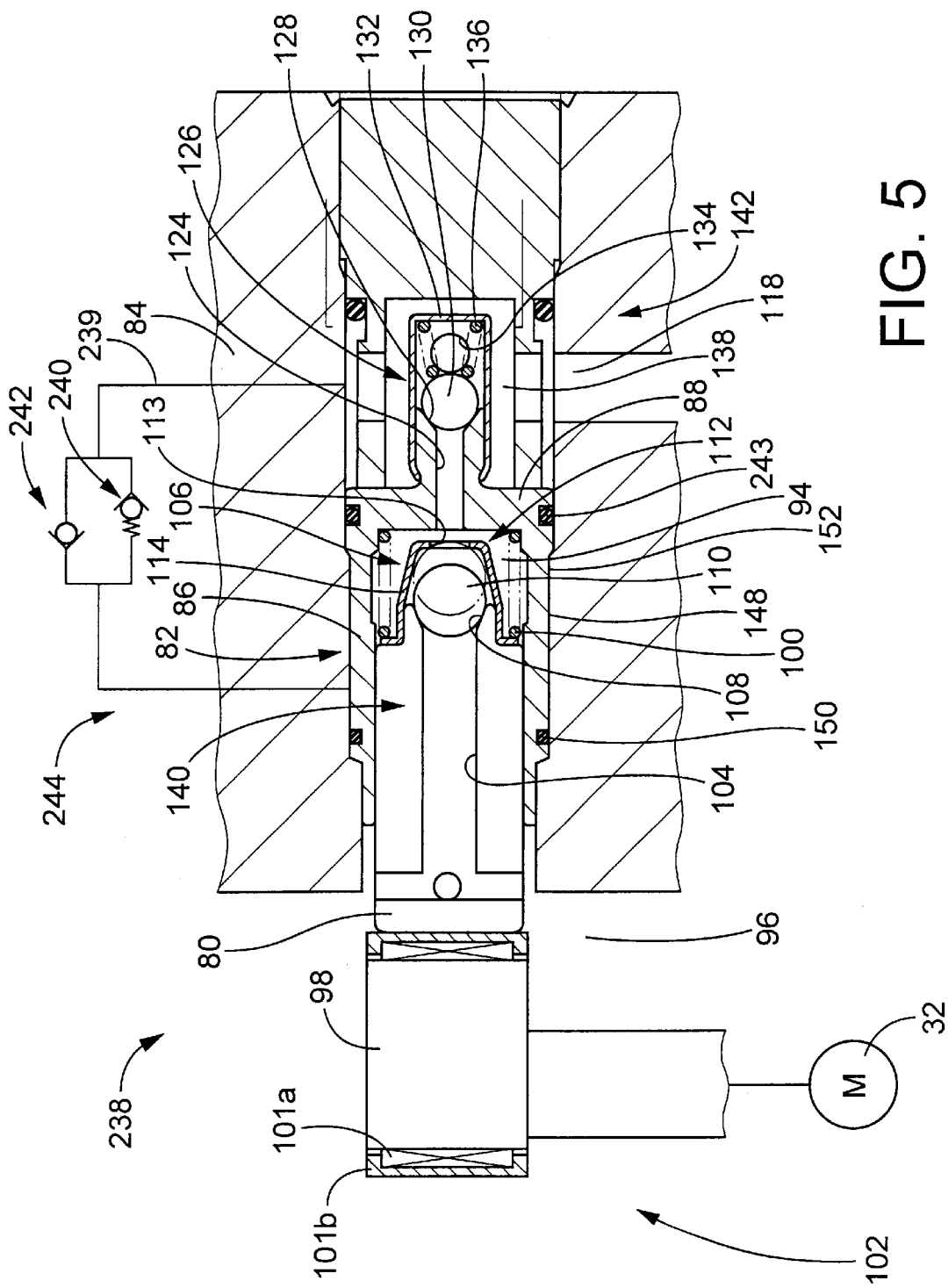
FIG. 5 is a view partly in cross section of a pump device according to a still further embodiment of the invention.

Referring to FIG. 5, there will be described a pump device 238 constructed according to a fourth embodiment of this invention. The pump device 238 has a fluid passage 239 connecting the discharge passage 118 and the fluid chamber 152. The fluid passage 239 is provided with a pressure relief valve 240 and a check valve 242, which are disposed in parallel connection with each other. The pressure relief valve 240 is arranged to permit a flow of the working fluid from the discharge passage 118 into the fluid chamber 152 when the fluid pressure in the discharge passage 118 becomes higher than that in the fluid chamber 152 by more than a predetermined amount. Two O-rings 150, 243 are provided as sealing members which cooperate with the cylindrical portion 86 and the housing 84 to define the fluid chamber 152. The sealing members 150, 243 isolate the fluid sucking portion 140 and the fluid discharging portion 142 from each other. In this arrangement, the fluid chamber 152 is supplied with the pressurized fluid when a difference of the fluid pressure in the discharge passage 118 with respect to the fluid pressure in the fluid chamber 152 exceeds the predetermined amount. This arrangement permits the cylindrical portion 86 to be forced against the piston 80 in a comparatively short time, with a force sufficient to inhibit the movement of the piston 80. Namely, the fluid pressure in the fluid chamber 152 can be rapidly raised as soon as the above-indicated difference exceeds the predetermined amount, so that the force of friction between the cylindrical portion 86 and the piston 80 can be rapidly increased to inhibit the movement of the piston 80.

The check valve 242 is provided to permit a flow of the working fluid in a direction from the fluid chamber 152 toward the discharge passage 118, but inhibit a flow of the fluid in the reverse direction. In a normal operation of the pump device 238, the fluid pressure in the discharge passage 118 is higher than that in the fluid chamber 152, so that the fluid flow from the discharge passage into the fluid chamber 152 through the check valve 242 is inhibited. When the fluid pressure in the discharge passage 118 is lowered after the pump device 238 is turned off, the fluid is permitted to flow through the check valve 242 from the fluid chamber 152 into the discharge passage 118. Thus, the check valve 242 permits a discharge flow of the fluid from the fluid chamber 152. In the present embodiment, the cylindrical portion 86, fluid passage 239, pressure relief valve 240, fluid chamber 152, etc. cooperate with each other to constitute a piston-movement restricting device 244.

Figure 6:
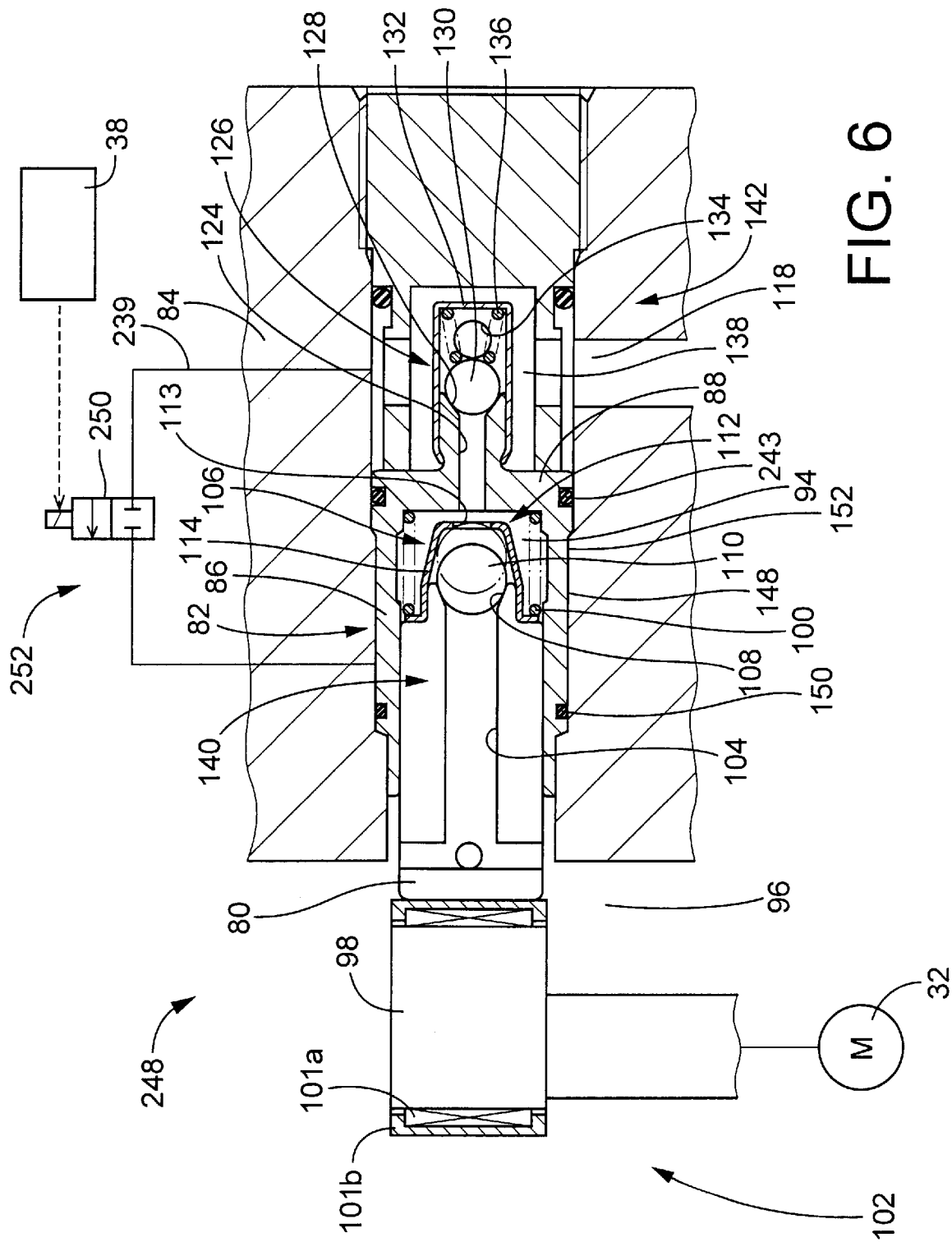
FIG. 6 is a view partly in cross section of a pump device according to a yet further embodiment of this invention.

Referring to FIG. 6, there will be described a pump device 248 constructed according to a fifth embodiment of this invention. In this pump device 248, an electromagnetic control valve 250 is provided between the discharge passage 118 and the fluid chamber 152. In the presence of the electromagnetic control valve 250, the fluid pressure in the discharge passage 118 at which the pressure of the fluid in the discharge passage 118 is applied to the fluid chamber 152 can be changed as desired. Namely, the electromagnetic control valve 250 is opened to permit a flow of the pressurized fluid from the discharge passage 118 to the fluid chamber 152, when the delivery pressure of the pump 30 (fluid pressure in the discharge passage 118) has been raised to a desired level, which is high enough to enable the cylindrical portion 86 to inhibit the movement of the piston 80. The electromagnetic control valve 250 is controlled by the control device 38.

In the present fifth embodiment, the moment of application of the fluid pressure in the discharge passage 118 to the fluid chamber 152 can be controlled by controlling the electromagnetic control valve 250. In other words, the movement of the piston 80 can be inhibited or permitted as needed, by selectively opening or closing the electromagnetic control valve, so that the pump device 248 can be selectively placed in the operated or non-operated state, by controlling the control valve 250. In this embodiment, therefore, the pump drive motor 32 need not be controlled by the control device 38.

In this embodiment, the cylindrical portion 86, electromagnetic control valve 250, fluid chamber 152, control device 38, etc. cooperate with each other to constitute a piston-movement restricting device 252.

Figure 7:
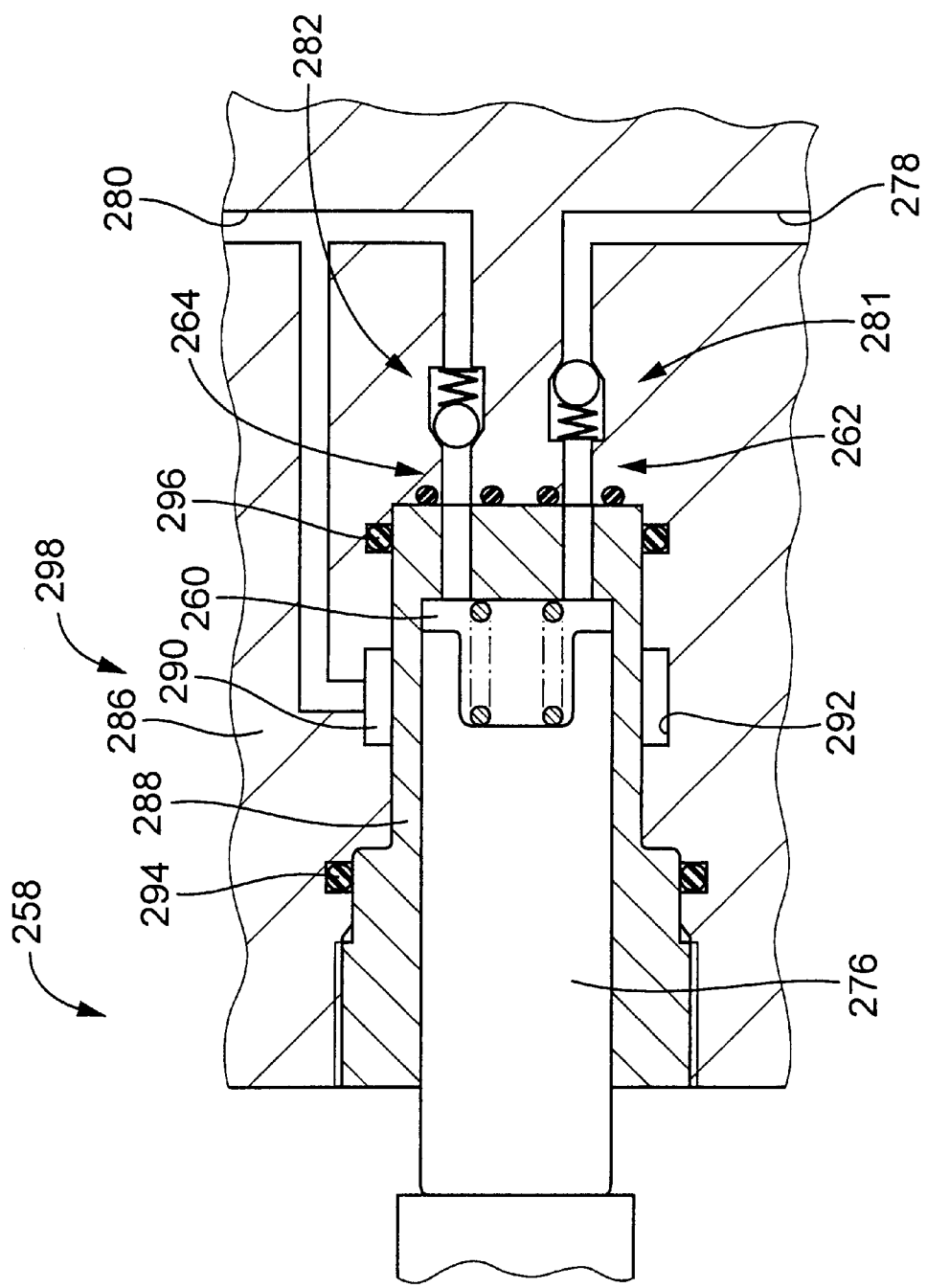
FIG. 7 is a view partly in cross section of a pump device according to another embodiment of the invention.

Referring next to FIG. 7, there will be described a pump device 258 constructed according to a sixth embodiment of this invention. In the pump device 258, a fluid sucking portion 262 for sucking the working fluid into a pump chamber 260, and a fluid discharging portion 264 from which the pressurized fluid is delivered are disposed on the same side of a piston (movable member) 276, which is remote from the eccentric cam 98. The fluid sucking portion 262 has a suction passage 278 communicating with the reservoir 34, while the fluid discharging portion 264 has a discharge passage 280 communicating with the accumulator 34. The suction and discharge passages 278, 280 are provided with respective suction and discharge valves 281, 282.

The pump device 258 includes a support member in the form of a cylinder 288 fitted in a housing 286 such that the cylinder 288 is not movable relative to the housing 286. The pump device 258 further includes a piston 276 slidably fitted in a fitting hole (fitting recess) formed in the cylinder 288. The housing 286 has an annular recess 292 formed in its inner circumferential surface. The annular recess 292 cooperates with the outer circumferential surface of the piston 276 to define a fluid chamber 290 communicating with a discharge passage 280. The fluid chamber 290 is supplied with the pressurized fluid delivered from the pump device 258. The cylinder 288 is elastically deformed in the radially inward direction to inhibit the movement of the piston 276 when the fluid pressure in the fluid chamber 290 has been raised to a predetermined level.

Two sealing members 294, 296 are disposed at respective opposite ends of the fluid chamber 290, between the cylinder 288 and the housing 286.

In the present sixth embodiment, a cylindrical portion of the cylinder 288, fluid chamber 290, sealing members 294, 296, discharge passage 280, etc. cooperate with each other to constitute a piston-movement restricting device 298.

Figure 8:
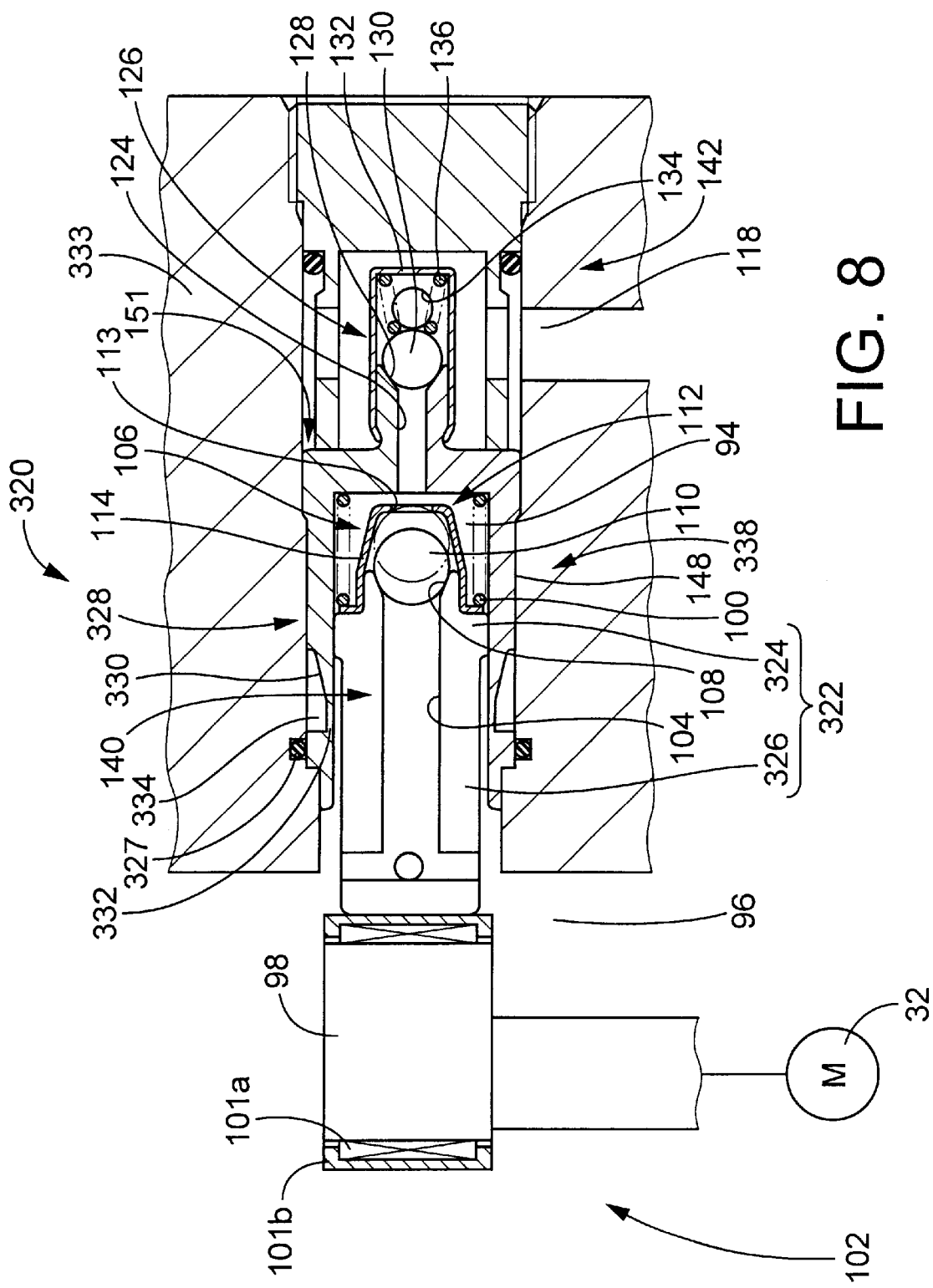
FIG. 8 is a view partly in cross section of a pump device according to a further embodiment of this invention.

While the piston-movement restricting devices 154, 210, 228, 244, 252 and 298 provided in the pump devices 20, 198, 218, 238, 248 and 258 according to the preceding embodiments of the invention are arranged to inhibit the movement of the piston, a pump device according to the principle of this invention may use a piston-movement restricting device which is arranged to reduce the operating stroke of the piston. This type of piston-movement restricting device will be described by reference to FIG. 8 showing a pump device 320 constructed according to a seventh embodiment of this invention. The pump device 320 includes a stepped movable member 322 which includes a large-diameter portion 324 serving as a piston, and a small-diameter portion 326 serving as a piston rod. The stepped movable member 322 is slidably fitted in a hole formed in a support member in the form of a cylinder 328, which is fixedly received in a housing 333. A sealing member in the form of an O-ring 327 is disposed between the inner circumferential surface of the housing 333 and the outer circumferential surface of the cylinder 328. The O-ring 327 is located on the low-pressure side of the large-diameter portion (piston) 324 when the movable member 322 is located at the fully advanced position or upper dead point. The cylinder 328 has an annular recess 330 formed in its outer circumferential surface, at a position on the high-pressure side of the O-ring 327, that is, between the O-ring 327 and the large-diameter portion 324 when the movable member 322 is located at the upper dead point. The annular recess 330 defines a radially inner thin cylindrical wall 332 of the cylinder 328, and cooperates with the inner circumferential surface of the housing 333 to define a fluid chamber 334, as in the pump device 198 shown in FIG. 3.

In the present embodiment of FIG. 8, the annular recess 330 is shaped such that the bottom surface of the recess 330 (outer surface of the cylindrical wall 332) is inclined by a small angle with respect to the inner circumferential surface of the cylinder 328. Described more specifically, the bottom surface of the recess 330 is inclined such that one of opposite end portions of the bottom surface which is on the high-pressure side of the pump device 320 is located radially outwardly of the other end portion located on the low-pressure side. Accordingly, the thickness of the cylindrical wall 332 of the cylinder 328 increases in the axial direction from the low-pressure side (fully retracted position or lower dead point of the movable member 322) toward the high-pressure side (fully advanced position or upper dead point), so that the cylindrical wall 332 is more easily elastically deformable at a section thereof on the low-pressure side, whereby this low-pressure-side section of the cylindrical wall 332 is elastically deformed at a lower fluid pressure in the fluid chamber 334, that is, before the other section (high-pressure-side section).

The axial position of the annular recess 330 substantially corresponds to the axial position of the small-diameter portion (piston rod) 326 of the movable member 322. When the cylindrical wall 332 is deformed in the radially inward direction, a movement of the large-diameter portion 324 past the cylindrical wall 332 is prevented by abutting contact of a shoulder surface between the small-diameter portion 326 and the large-diameter portion 324, with the radially inwardly deformed part of the cylindrical wall 332. In other words, the position at which the retracting movement of the movable member 322 is stopped is determined by the abutting contact of the above-indicated shoulder surface of the movable member 322 with the radially inward deformed part of the cylindrical wall 332. As a result, the radially inward deformation of the cylindrical wall 332 reduces the operating stroke of the movable member 322, and accordingly reduces the volume of the pressurized fluid delivered from the pump device 320 by one reciprocation of the movable member 322.

As shown in FIG. 8 and described above, the thickness of the cylindrical wall 332 of the cylinder 328 increases in the axial direction from the low-pressure side toward the high-pressure side, so that the cylindrical wall 332 is more easily elastically deformable at its low-pressure side, whereby this low-pressure-side section of the cylindrical wall 332 is elastically deformed at a lower fluid pressure in the fluid chamber 334. As the fluid pressure in the fluid chamber 334 is increased, the cylindrical wall 332 is deformed initially at its low-pressure-side section, and then at the high-pressure-side section as well. Thus, the operating stroke of the movable member 322 is gradually reduced as the fluid pressure in the fluid chamber 334 is increased. Eventually, the high-pressure-side end part of the cylindrical wall 332 is radially inwardly deformed into contact with the shoulder surface between the large-diameter and small-diameter portions 324, 326 of the movable member 322 when the movable member 322 is located at its upper dead point or fully advanced position. Thus, a retracting movement of the movable member 322 from the upper dead point is inhibited by the elastically deformed cylindrical wall 332.

In the present embodiment, the large-diameter portion 324 and the small-diameter portion 326 of the movable member 322 are considered to serve as the piston and the piston rod, respectively, and the annular recess 330, fluid chamber 334, cylindrical wall 332, large-diameter portion 324, etc. cooperate with each other to constitute a piston-movement restricting device 338.

It is to be understood that a pump device according to the present invention may include a combination of the features of the pump device of FIG. 3, 7 or 8 and the features of the pump device of FIG. 5 or 6.

Figure 9:
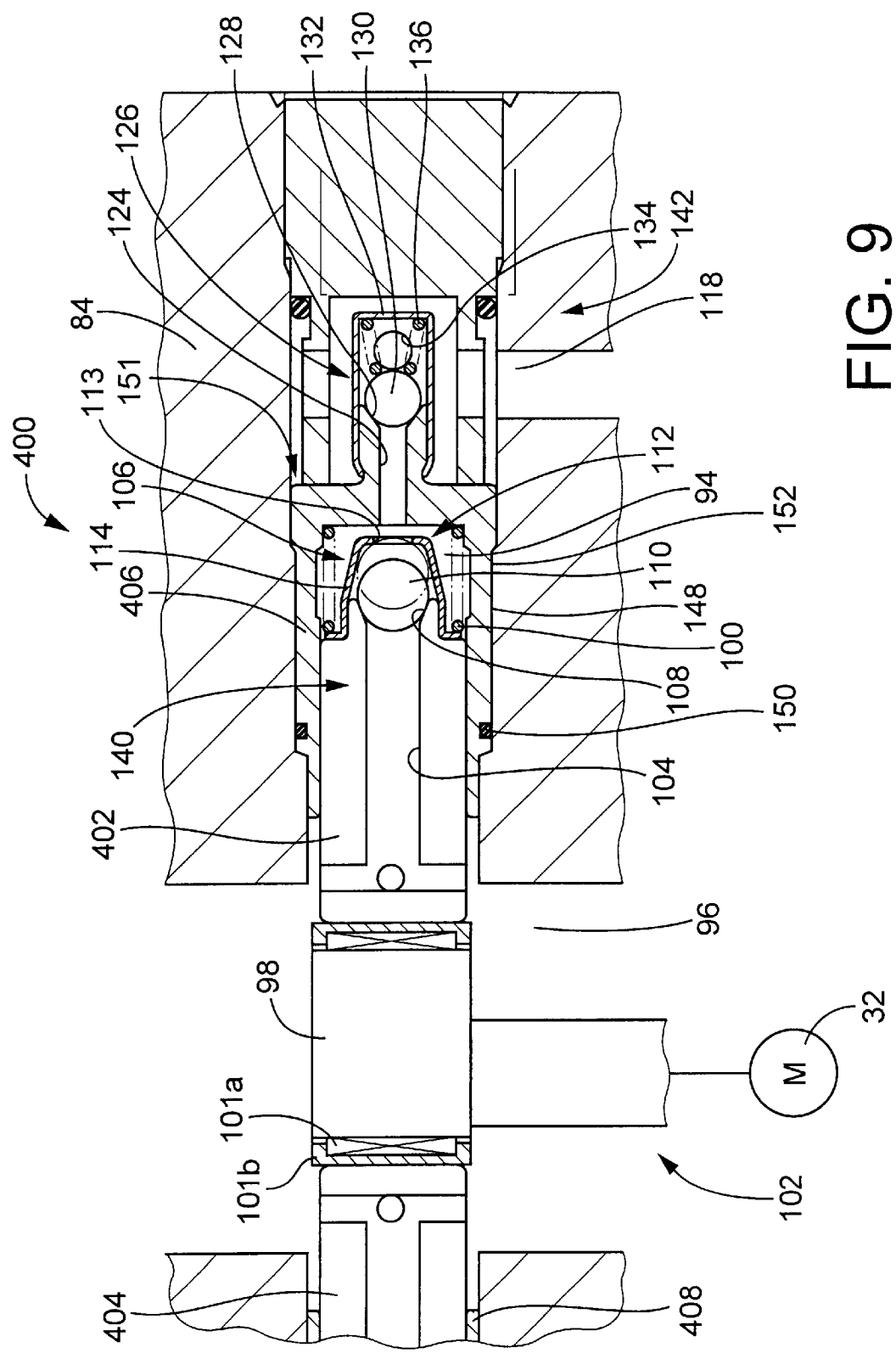
FIG. 9 is a view partly in cross section of a pump device according to a still further embodiment of this invention.

Referring next to FIG. 9, there will be described a pump device 400 which is constructed according to an eighth embodiment of this invention and which includes two movable members in the form of two pistons 402, 404 the movements of which are inhibited at different times. The two pistons 402, 404 are slidably received in respective cylinders 406, 408. The movements of these pistons 402, 404 are inhibited at different fluid pressures in the fluid chambers 152. In the present embodiment, the various factors indicated above with respect to the first embodiment are determined so that the movement of the piston 402 is inhibited before that of the piston 404 is inhibited, that is, at a lower fluid pressure in the fluid chamber 152, than that of the piston 404.

Figure 10:
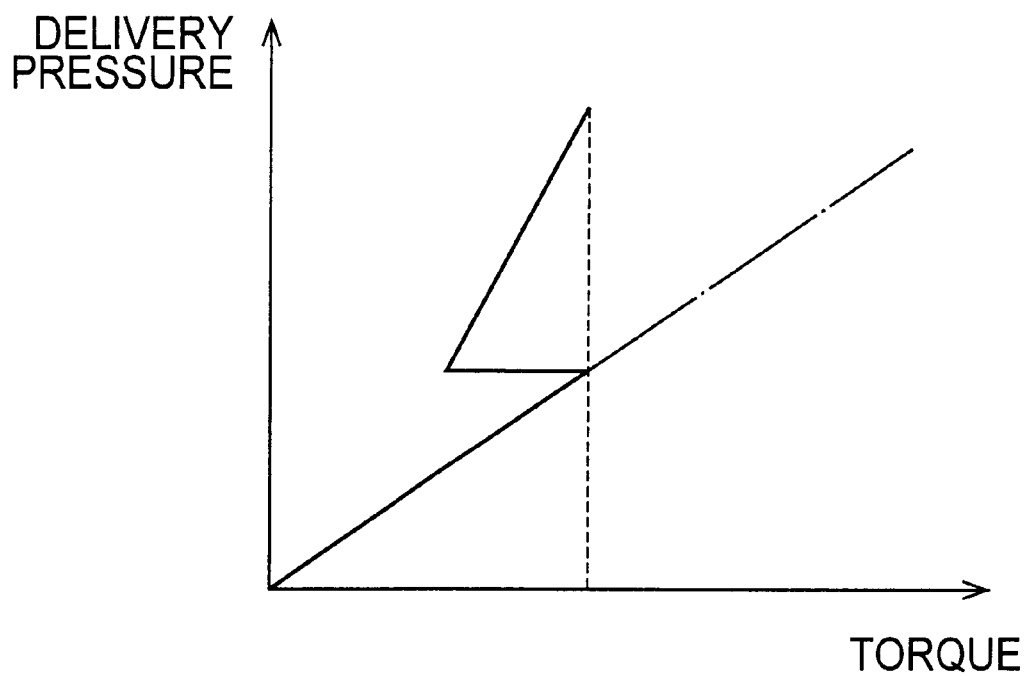
FIG. 10 is a view indicating a relationship between a pressure of a pressurized fluid delivered from the pump device and a torque of a pump drive motor.

Accordingly, the pump device 400 delivers a relatively large volume of pressurized fluid before the movement of the piston 402 is inhibited. The volume of the delivered pressurized fluid is reduced after the movement of the piston 402 is inhibited. As shown in FIG. 10, a drive torque T of the pump drive motor 32 required to operate the pump 30 to deliver a volume V of a pressurized fluid having a pressure P is represented by the following equation:

$$T = P \cdot V N / 2\pi$$

To obtain the drive torque T, the pump drive motor 32 is required to be operated with an electric current the amount of which corresponds to the drive torque T. In the present embodiment wherein the movement of the piston 402 is inhibited when the delivery pressure has been raised to the predetermined level, the volume V of the delivered pressurized fluid is reduced to ½ of the nominal value, so that the torque T required to establish the delivery pressure P is reduced to ½ of the nominal value, whereby the required amount of consumption of the electric energy by the pump drive motor 32 is reduced.

In connection with the above-indicated reduction of the volume V, it is noted that a device such as the wheel brake cylinder 42 to be operated by the pressurized fluid delivered from the pump device 400 usually requires a relatively small volume of the pressurized fluid when the pressure of the pressurized fluid is relatively high. In this case, therefore, the required size of the pump drive motor 32 can be reduced.

The pump device may include three or more pistons. In this case, the movements of all of the pistons may be inhibited at the same time. Alternatively, the movement of one of the pistons may be inhibited at a point of time different from a point of time at which the movements of the other pistons are inhibited. Further, the pump device 400 according to the embodiment of FIG. 9 may employ an arrangement of any one of the pump devices of FIGS. 3–8.

Figure 11:
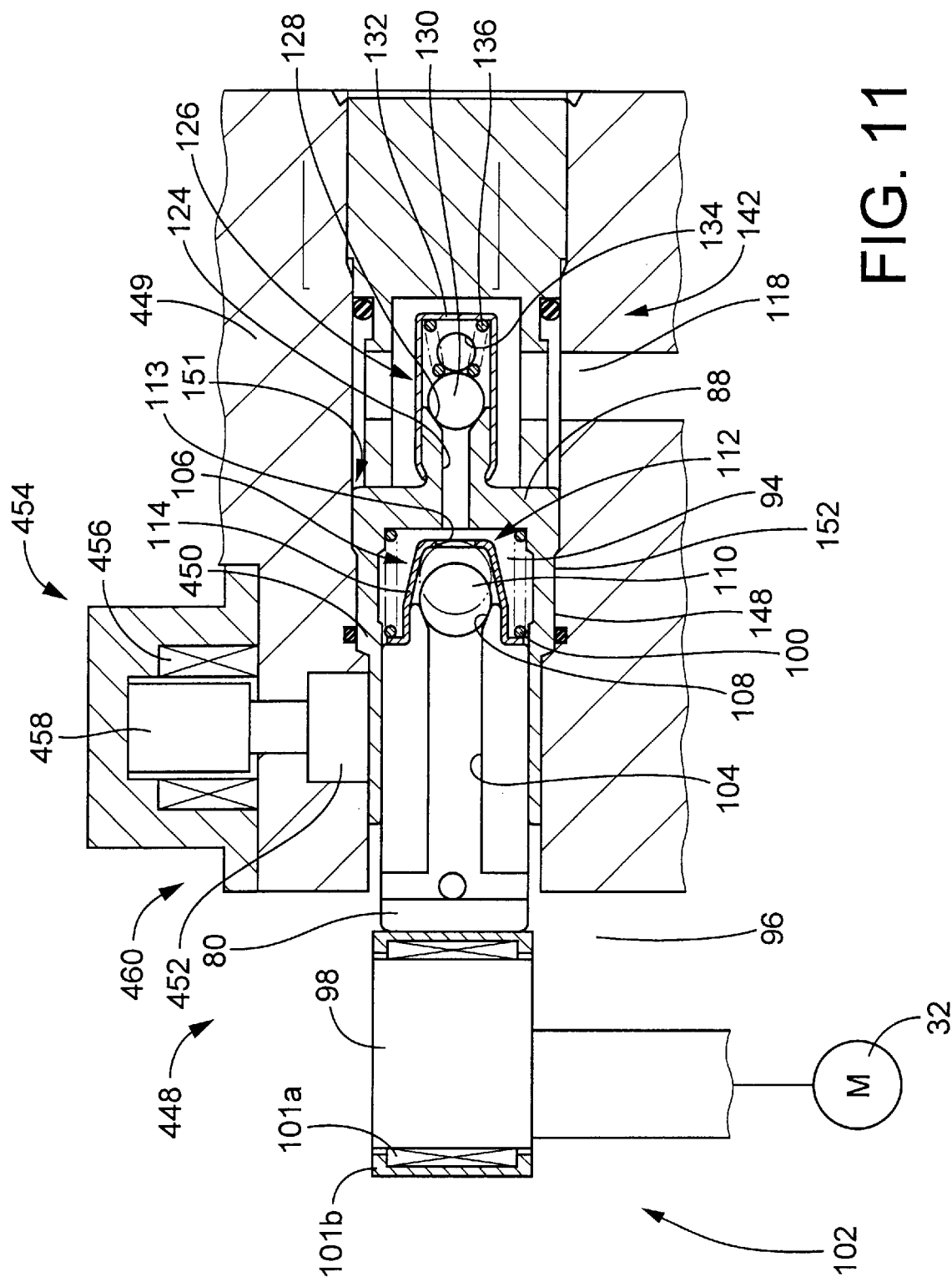
FIG. 11 is a view partly in cross section of a pump device according to still another embodiment of this invention.

While the preceding embodiments are all arranged to utilize the delivery pressure of the pump device to inhibit or restrict the movement of the piston, the movement of the piston may be inhibited by utilizing an electromagnetic force, as in a pump device 448 shown in FIG. 11, which is constructed according to a ninth embodiment of this invention. The pump device 448 includes a housing 449, and a support member in the form of a cylinder 450 which is fixedly received in the housing 449. The cylinder 450 is provided with a pressing head 452 disposed for pressing contact with its circumferential surface. The cylinder 449 is provided with a solenoid device 454 disposed in alignment with the pressing head 352 in the axial direction of the cylinder 450. The solenoid device 454 includes a coil 456, and a presser member 458. While the coil 456 is in an off state without an electric current applied thereto, the presser member 458 is placed in a non-operated position at which a force is not applied from the presser member 458 to the pressing head 452. When the coil 456 is energized with an electric current applied thereto, the solenoid device 454 produces an electromagnetic force for forcing the presser member 458 onto the pressing head 452, so that a cylindrical portion of the cylinder 450 is radially inwardly pressed by the pressing head 452, and is elastically deformed in the radially inward direction, whereby the cylindrical portion is radially inwardly forced against the movable member in the form of the piston 80. The movement of the piston 80 is inhibited by a force of friction between the cylinder 450 and the piston 80, when the force of friction becomes larger than the biasing force of the spring 100. In this present ninth embodiment, the cylindrical portion of the cylinder 450, solenoid device 454 and pressing head 452 cooperate with each other to constitute a piston-movement restricting device 460.

The piston-movement restricting device 460 may include a plurality of solenoid devices 454 which are arranged in the circumferential direction of the cylinder 450. In this case, a sufficiently large total electromagnetic force can be produced by the solenoid devices 454, so that the movement of the piston 80 can be inhibited with high stability.

Figure 12:
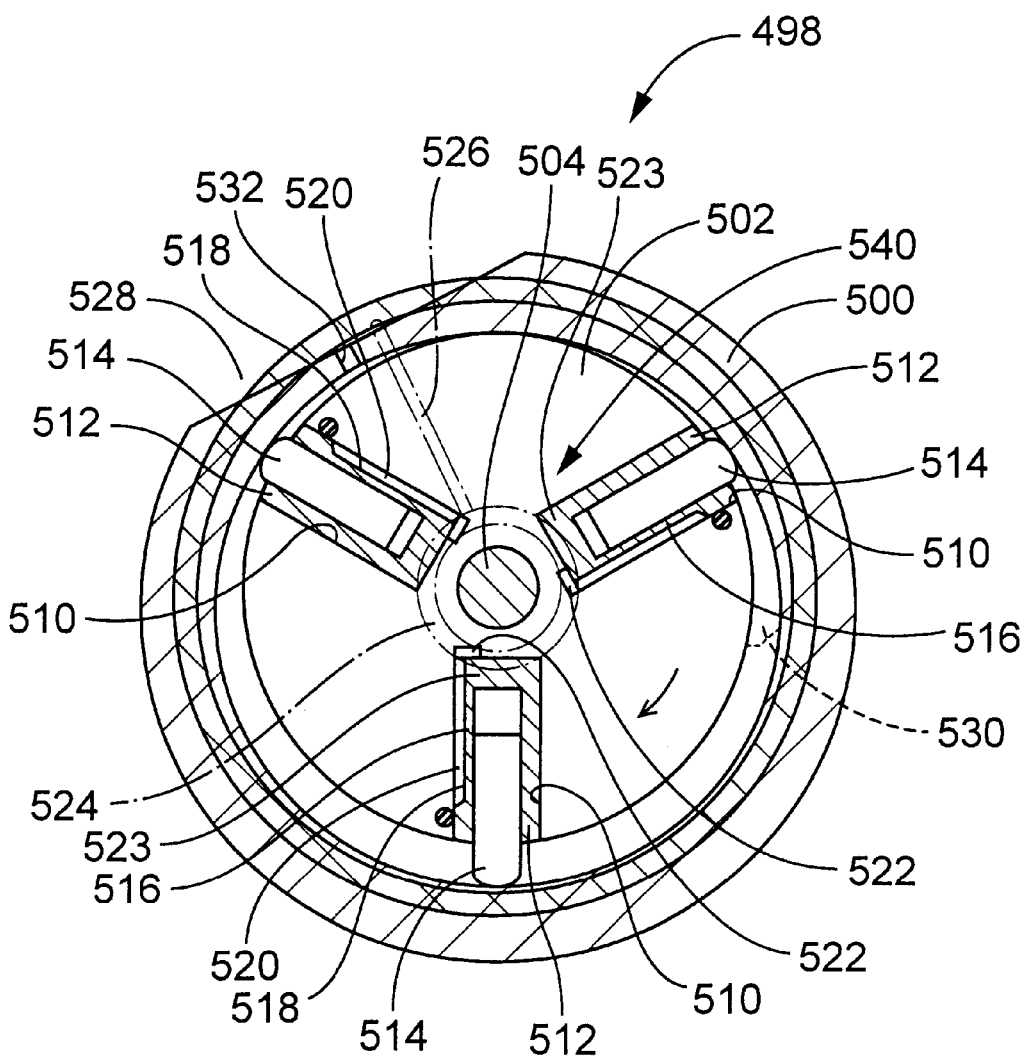
FIG. 12 is a view partly in cross section of a pump device according to a yet further embodiment of this invention.

The principle of the present invention is applicable to a vane pump as well as a plunger pump as in the illustrated embodiments described above. Referring to FIG. 12, there is shown a pump device 498 including a cylindrical housing 500 in which is accommodated a rotor 502 of generally cylindrical shape, such that the rotor 502 is rotatable about a rotary shaft 504. The rotary shaft 504 is disposed eccentrically with respect to the cylindrical housing and is rotated by a drive motor (not shown). The rotor 502 has a plurality of radial grooves 510 formed therethrough over the entire axial length thereof and so as to extend in the radial direction. In each of the radial grooves 510, there is disposed a deformable member 512 having a U shape in cross section. The deformable member 512 has a bottom portion 523 at which the deformable member 512 is press-fitted in the radial groove 510 such that the deformable member 512 is not movable relative to the rotor 502.

Each U-shaped deformable member 512 has a receptacle in which a movable member in the form of a vane 514 is slidable fitted. The U-shaped deformable member 512 has a pair of opposite side walls 516, one of which has a plurality of recesses 518 open in its outer surface facing the corresponding inner surface of the radial groove 510. The recesses 518 are formed so as to extend in the radial direction and are spaced apart from each other in the axial direction of the rotor 502. The recesses 518 cooperate with the inner surface of each radial groove 510 to define a plurality of fluid chambers 520. The rotor 502 has axial grooves 522 which extend in the axial direction and is open in the bottom surface of the radial grooves 510. Each of these axial grooves 522 is held in communication with the plurality of recesses 518 (fluid chambers 520) provided for each axial groove 522, so that the recesses 518 are held in communication with each other through the axial groove 522.

A pair of side plates (not shown) are disposed at respective axial ends of the rotor 502. One of these side plates has an annular groove 524 which has a diameter corresponding to the radial position of the axial grooves 522 and which is held in communication with the axial grooves 522. The annular groove 524 is connected to a discharge passage 528 through a fluid passage 526 also formed in the above-indicated side plate.

When the rotor 502 is rotated in the direction indicated by arrow in FIG. 12, the vanes 514 are reciprocated in the respective radial grooves 510, with their outer end faces held in sliding contact with the inner circumferential surface of the cylindrical housing 500. At least one variable-volume chamber is defined by the outer circumferential surface of the rotor 502, the inner circumferential surface of the cylindrical housing 500 and the outer end portion of at least one of the vanes 514. The volume of each variable-volume chamber is changed during rotation of the rotor 502. The pump device 498 has a suction port 530 and a discharge port 532. The working fluid sucked into each variable-volume chamber is pressurized therein, and the pressurized fluid is discharged into the discharge passage 528 through the discharge port 532 and a discharge valve (not shown). The pressure of the pressurized fluid in the discharge passage 528 is applied to the fluid chambers 520 through the fluid passage 526, annular groove 524 and the axial grooves 522. When the fluid pressure in each fluid chamber 520 becomes higher than a predetermined level, the side wall 516 having the corresponding recess 518 is elastically deformed, that is, elastically flexed about the bottom portion 523 toward the corresponding vane 514. As a result, the clearance between the side wall 516 and the vane 514 is zeroed, and the side wall 516 is forced onto the vane 514, to thereby inhibit the reciprocating movement of the vane 514 within the corresponding radial groove 510. That is, the vane 514 is held stationary during rotation of the rotor 502. Accordingly, the working fluid is not pressurized to a high pressure. As a result, the amount of consumption of the electric energy by the drive motor to rotate the rotor 502 is reduced.

In the present tenth embodiment, one of the side walls 516, fluid passage 526, annular groove 524, axial grooves 522, fluid chambers 520, etc. cooperate with each other to constitute a vane-movement restricting device 540.

The pump device according to the present invention can be used as a fluid-recirculating pump device for returning the working fluid from a pressure-reducing reservoir to a main fluid passage which connects the master cylinder 12 and the wheel brake cylinder 42. The pressure-reducing reservoir is provided to temporarily accommodate the working fluid discharged from the wheel brake cylinder 42 through the pressure reducing valve 56. The fluid-recirculating pump device may be referred to as a slip-control pump device, or an anti-lock braking-pressure control pump device.

The pump device according to the present invention is applicable to any hydraulically operated devices other than a hydraulically operated braking system for an automotive vehicle. For instance, the pump device may be used for activating a suspension system or a steering system for an automotive vehicle. The pump device is also applicable to any systems other than automotive vehicles, which system a hydraulic actuator. For instance, the pump device may be used for a wide variety of hydraulic actuators employed in airplanes, robots and industrial plants. Further, the principle of the present invention is applicable to an air pump and other gas pump arranged to pressurize a gas, as well as a hydraulic pump.

It will be understood that the various forms of the movement restricting device which have been described may be considered to be a pressing device operable to apply a pressing force to the movable member in the form of a piston or vane in a direction intersecting the direction of movement of the movable member.

It is to be understood that the present invention may be embodied with various other changes and improvements, such as those described in the SUMMARY OF THE INVENTION, which may occur to those skilled in the art.

What is claimed is:

1. A pump device including a support member having a fitting recess, and a movable member which is reciprocated in said fitting recess to suck a working fluid, pressurize the fluid and deliver the pressurized fluid, said pump device comprising:

a movement restricting device operable to deform a wall at least partially defining said fitting recess of said support member, such that said wall is deformed toward said movable member, for restricting a reciprocating movement of said movable member in said fitting recess, at least when an amount of the pressurized fluid required to be delivered by the pump device is smaller than a nominal delivery amount of the pump device.

2. A pump device according to claim 1, wherein said movement restricting device includes a hydraulically operated movement restricting device operable to deform said wall, on the basis of a pressure of the pressurized fluid delivered by the pump device.

3. A pump device according to claim 1, wherein said movement restricting device is operable to deform said wall when a pressure of the pressurized fluid delivered by the pump device becomes higher than a predetermined value.

4. A pump device according to claim 1, wherein said movement restricting device permits the reciprocating movement of said movable member when the pump device is required to deliver the pressurized fluid, and inhibits the reciprocating movement of said movable member when the pump device is not required to deliver the pressurized fluid.

5. A pump device according to claim 1, wherein said movement restricting device is operable to deform said wall for inhibiting the reciprocating movement of said movable member located at a predetermined position while the pump device is not required to deliver the pressurized fluid.

6. A pump device according to claim 1, wherein said movement restricting device is operable to deform said wall to make a reciprocating stroke of said movable member smaller when the amount of the pressurized fluid required to be delivered by the pump device is smaller than said nominal delivery amount.

7. A pump device according to claim 1, wherein said support member includes a cylinder having as said wall a cylindrical portion which partially defines a cylinder bore as said fitting recess, and said movable member includes a piston reciprocably fitted in said cylinder bore, said cylindrical portion having an outer circumferential surface partially defining a pressure chamber which receives said pressurized fluid through a fluid-introducing portion.

8. A pump device according to claim 7, comprising: a fluid sucking portion and a fluid discharging portion which are spaced apart from each other in an axial direction of said piston; a housing in which said cylinder is fitted; and at least one sealing member disposed between said housing and said cylindrical portion of said cylinder and isolating said fluid sucking portion and said fluid discharging portion.

9. A pump device according to claim 8, wherein said pressure chamber consists of a portion of a gap between said cylinder and said housing, which portion is located on one side of said at least one sealing member that is nearer to said fluid discharging portion.

10. A pump device according to claim 8, wherein said at least one sealing member includes a sealing member located on one side of a front axial end of said piston which one side is nearer to said fluid sucking portion when said piston is located at a fully advanced position thereof on the side of said fluid discharging portion, said front axial end being located on the side of said fluid discharging portion.

11. A pump device according to claim 8, wherein said at least one sealing member includes a sealing member located at a position which is on one side of a midpoint between axial opposite axial ends of said piston when said piston is located at a fully advanced position thereof on the side of said fluid discharging position, said one side of said midpoint being nearer to a fully retracted position on the side of said fluid sucking portion.

12. A pump device according to claim 7, wherein at least one of an outer circumferential surface of said cylinder and an inner circumferential surface of said housing has at least one recess each of which provides said pressure chamber.

13. A pump device according to claim 7, comprising a fluid sucking portion and a fluid discharging portion which are spaced apart from each other in an axial direction of said piston, and wherein said cylinder further has an annular groove which has an annular shape in transverse cross section of said cylinder and a diameter larger than said cylinder bore, said annular groove extending in an axial direction of said cylinder and having a closed end on the side of said fluid sucking portion, and an open end on the side of said fluid discharging portion, said annular groove and said cylinder bore cooperating with each other to define said cylindrical portion serving as said wall, said annular groove providing said pressure chamber.

14. A pump device according to claim 1, wherein said movement restricting device includes a switching device operable between a first state for permitting deformation of said wall and a second state for inhibiting the deformation of said wall.

15. A pump device according to claim 1, wherein said movement restricting device includes a buffer device operable to reduce a change of the pressure of the pressurized fluid to be delivered by the pump device.

16. A pump device according to claim 1, wherein said movement restricting device includes an electromagnetically operated device which includes a coil and which produces an electromagnetic force for deforming said wall, upon energization of said coil with an electric current.

17. A pump device according to claim 1, further comprising:
 a drive device operable in contact with said movable member to advance said movable member in an advancing direction; and
 a biasing device biasing said movable member in a retracting direction opposite to said advancing direction, for forcing said movable member onto said drive device.

18. A pump device according to claim 1, further comprising a drive device operable in contact with said movable member, to advance said movable member, and wherein said drive device includes a drive member not connected to said movable member.

19. A pump device according to claim 1, further comprising a fluid sucking portion, and wherein said movable member partially defines a pump chamber in front of said movable member, and carries a suction valve operable between a first state for permitting a flow of the working fluid into said pump chamber through said fluid sucking portion, and a second state for inhibiting said flow of the working fluid into said pump chamber.

20. A pump device according to claim 19, wherein said suction valve includes a valve seat formed on a front end face of said movable member, a valve member movable toward and away from said valve seat according to a difference between pressures of the fluid in said fluid sucking portion and said pump chamber, and a holder member for holding said valve member, said holder member having an internal dimension which is smaller at a position relatively distant from said valve seat, than at a position relatively near said valve seat.

21. A pump device according to claim 1, wherein said movable member consists of a plurality of separate movable members which are fitted in respective fitting recesss of said support member.

22. A pump device according to claim 21, wherein said movement restricting device restricts the movement of at least one of said plurality of separate movable members at a point of time different from that at which the movement of the other movable member or members is restricted.

23. A pump device according to claim 1, comprising at least one of a piston pump and a vane pump.

24. A pump device according to claim 1, which is provided in a braking system for a vehicle, to supply a wheel brake cylinder with the pressurized fluid, to brake a wheel of the vehicle.

25. A pump device including a support member having a fitting recess, and a movable member which is reciprocated in said fitting recess to suck a working fluid, pressurize the fluid and deliver the pressurized fluid, said pump device comprising:
 a movement restricting device operable to deform a wall at least partially defining said fitting recess of said support member, such that said wall is deformed inwardly of said fitting recess, for restricting a reciprocating movement of said movable member in said fitting recess, and such that an amount of deformation of said wall is larger when an amount of the pressurized fluid required to be delivered by the pump device is relatively small than when said amount is relatively large.

26. A pump device including a support member having a fitting recess, and a movable member which is reciprocated in said fitting recess to suck a working fluid, pressurize the fluid and deliver the pressurized fluid, said pump device comprising:

a pressing device operable to apply a pressing force to said movable member in a direction intersecting a direction of reciprocation of said movable member, when an amount of the pressurized fluid required to be delivered by the pump device is smaller than a nominal delivery amount of the pump device.

27. A pump device including a support member having a fitting recess, and a movable member which is reciprocated in said fitting recess to suck a working fluid, pressurize the fluid and deliver the pressurized fluid, said pump device comprising:

a clamping device operable to deform a wall partially defining said fitting recess of said support member, such that said wall is deformed inwardly of said fitting recess, for clamping said movable member at a non-delivery position thereof, at least when an amount of the pressurized fluid required to be delivered by the pump device is smaller than a nominal delivery amount of the pump device, the amount of the pressurized fluid delivered by the pump being zero when said movable member is located at said non-delivery position.

28. A pump device according to claim 27, wherein said support member includes a cylinder having as said wall a cylindrical portion which partially defines a cylinder bore as said fitting recess, and said movable member includes a piston reciprocably fitted in said cylinder bore, said cylindrical portion being deformed radially inwardly of said cylinder bore, for clamping said piston when said piston is located at a fully advanced position as said non-delivery position.

29. A pump device according to claim 27, wherein said support member includes a rotor having a plurality of radial grooves and a plurality of deformable members fixedly disposed as said wall in said radial grooves, respectively, each of said deformable members defining said fitting recess, said movable member including a plurality of vanes each of which is fitted in said fitting recess movably in a corresponding one of said radial grooves, between a fully advanced position on a radially outer side of said rotor and a fully retracted position on a radially inner side of said rotor, said deformable members being deformed inwardly of said radial grooves, for clamping said vanes when said vanes are located at said fully retracted position as said non-delivery position.

* * * * *